US012623715B2

(12) United States Patent
Fujimoto

(10) Patent No.: US 12,623,715 B2
(45) Date of Patent: May 12, 2026

(54) ELECTRIC POWER STEERING DEVICE

(71) Applicant: Mitsubishi Electric Corporation, Tokyo (JP)

(72) Inventor: Chiaki Fujimoto, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 78 days.

(21) Appl. No.: 18/691,708

(22) PCT Filed: Dec. 14, 2021

(86) PCT No.: PCT/JP2021/045999
§ 371 (c)(1),
(2) Date: Mar. 13, 2024

(87) PCT Pub. No.: WO2023/112133
PCT Pub. Date: Jun. 22, 2023

(65) Prior Publication Data
US 2024/0375705 A1 Nov. 14, 2024

(51) Int. Cl.
*B62D 5/04* (2006.01)
*B60W 60/00* (2020.01)
*B62D 6/00* (2006.01)

(52) U.S. Cl.
CPC ........... *B62D 5/046* (2013.01); *B60W 60/001* (2020.02); *B62D 6/00* (2013.01)

(58) Field of Classification Search
CPC ........ B62D 5/046; B62D 6/00; B62D 5/0463; B62D 6/007; B62D 5/003; B62D 5/0487;
(Continued)

(56) References Cited

U.S. PATENT DOCUMENTS 10,974,736 B2 * 4/2021 Odate ............... B60W 60/0015
2002/0022914 A1 * 2/2002 Kawada ............... B62D 5/0493
180/443
(Continued)

FOREIGN PATENT DOCUMENTS

CN 100575169 C * 12/2009 ........... B62D 5/0481
EP 2949546 A2 12/2015
(Continued)

OTHER PUBLICATIONS

JP-2007125959-A translation (Year: 2007).*
(Continued)

*Primary Examiner* — Kyle T Johnson
(74) *Attorney, Agent, or Firm* — Sughrue Mion, PLLC

(57) ABSTRACT

A first motor control measure sends a first command to a second motor control measure in order to conduct drive control of a motor when conducting steering assist control, and assists drive of the motor by conducting drive control of the motor based on a second command sent from the second motor control measure to conduct drive control of the motor when conducting the steering assist control, and the second motor control measure sends the second command to the first motor control measure when conducting autonomous drive assist control, and assists drive of the motor by conducting drive control of the motor based on the first command to conduct the steering assist control.

12 Claims, 18 Drawing Sheets

(58) Field of Classification Search
CPC ...... B62D 15/025; B62D 5/04; B62D 5/0484;
B60W 60/001
See application file for complete search history.

(56) References Cited

U.S. PATENT DOCUMENTS

| | | | | |
|---|---|---|---|---|
| 2009/0055050 | A1* | 2/2009 | Onuma | B62D 5/0481 |
| | | | | 701/41 |
| 2013/0173118 | A1* | 7/2013 | Suzuki | B62D 6/002 |
| | | | | 701/41 |
| 2014/0156144 | A1* | 6/2014 | Hoshi | H02P 29/0241 |
| | | | | 318/400.15 |
| 2015/0329140 | A1* | 11/2015 | Tamaizumi | B62D 6/003 |
| | | | | 701/42 |
| 2015/0336606 | A1* | 11/2015 | Shibuya | B62D 5/001 |
| | | | | 180/444 |
| 2015/0353128 | A1* | 12/2015 | Shibuya | B60W 10/02 |
| | | | | 701/41 |
| 2015/0360715 | A1* | 12/2015 | Shimizu | B62D 5/0484 |
| | | | | 701/43 |
| 2018/0154929 | A1* | 6/2018 | Nejo | B62D 15/0285 |
| 2018/0304917 | A1* | 10/2018 | Michelis | B60W 10/16 |
| 2019/0002019 | A1* | 1/2019 | Tsubaki | B62D 5/0463 |
| 2019/0241214 | A1* | 8/2019 | Oka | B62D 6/10 |
| 2020/0346687 | A1* | 11/2020 | Sakaguchi | B62D 15/0235 |
| 2021/0300392 | A1* | 9/2021 | Shionome | G07C 5/0816 |
| 2023/0356728 | A1* | 11/2023 | Jain | G06F 3/013 |
| 2024/0375705 | A1* | 11/2024 | Fujimoto | B62D 6/007 |
| 2024/0375713 | A1* | 11/2024 | Osajima | B62D 5/0472 |

FOREIGN PATENT DOCUMENTS

| | | | | | |
|---|---|---|---|---|---|
| JP | S63203472 | A | * | 8/1988 | |
| JP | 4120427 | B2 | * | 7/2006 | B62D 5/046 |
| JP | 2006213085 | A | * | 8/2006 | |
| JP | 2007125959 | A | * | 5/2007 | |
| JP | 2012-056404 | A | | 3/2012 | |
| JP | 2019-014432 | A | | 1/2019 | |
| WO | 2016/199839 | A1 | | 12/2016 | |

OTHER PUBLICATIONS

JP-S63203472-A translation (Year: 1998).*
JP-2006213085-A translation (Year: 2006).*
CN-100575169-C translation (Year: 2009).*
JP-4120427-B2 translation (Year: 2008).*
A_study_on_applicable_control_methods_of_electric_power_steering_
system (Year: 2018).*
Extended European Search Report issued Dec. 3, 2024 in Applica-
tion No. 21968051.9.

* cited by examiner

ELECTRIC POWER STEERING DEVICE

CROSS REFERENCE TO RELATED APPLICATIONS

This application is a National Stage of International Application No. PCT/JP2021/045999 filed Dec. 14, 2021.

TECHNICAL FIELD

The present disclosure relates to an electric power steering device.

BACKGROUND ART

Conventionally, an electric power steering device that conducts steering assist control as well as autonomous drive assist control is known as an electric power steering device that assists steering of a motor drive (refer to Patent Document 1). The steering assist control is a control that supplies steering assist torque from a motor driving force when assisting a vehicle operator in steering operations. Autonomous drive assist control is a control where a course of direction of a vehicle is changed by changing a steering angle regardless of the vehicle operator steering (for example, a parking-assist system or a route-follow control or the like).

CITATION LIST

Patent Document

[Patent Document 1] Japanese Unexamined Patent Application, First Publication 2012-56404

SUMMARY OF INVENTION

Problem to be Solved by Invention

In Patent Document 1, a first motor control circuit that conducts steering assist control, and a second motor control circuit that conducts autonomous drive assist control are configured independently from one another. Thus, there are cases where it is not possible to maintain steering assist when an abnormality occurs during steering assist control due to a first motor control circuit, and it is not possible to maintain autonomous drive assist when an abnormality occurs during autonomous drive assist control due to a second motor control circuit.

The present disclosure has been made in order to address the problem above, and an object is to provide an electric power steering device that maintains steering assist even when an abnormality occurs during steering assist control, and that maintains autonomous drive assist control even when an abnormality occurs during autonomous control.

Means to Solve the Problem

An electric power steering device according to an embodiment of the present disclosure includes a vehicle condition sensor that detects vehicle condition of a vehicle, and detects information outside to the vehicle; an autonomous drive assist controller that generates a steering angle command of a steering of the vehicle based on detection results of the vehicle condition sensor; a torque sensor that detects a steering torque of the steering; a motor that is rotated to obtain the steering angle of the steering; a first motor controller that conducts steering assist control to assist steering of the motor based on detection results of the torque sensor, and a second motor controller that conducts autonomous drive assist control that conducts autonomous steering of the steering by drive control of the motor, according to the steering angle command, wherein: the first motor controller sends a first command to the second motor controller in order to conduct drive control of the motor when conducting the steering assist control, and assists drive of the motor by drive control of the motor based on a second command sent from the second motor controller to conduct drive control of the motor when conducting the steering assist control, and the second motor controller sends the second command to the first motor controller when conducting the autonomous drive assist control, and assists drive of the motor by drive control of the motor based on the first command to conduct the steering assist control.

Effects of the Invention

As explained above, according to the present disclosure, it is possible to maintain steering assist even when an abnormality occurs during steering assist control, and to maintain autonomous drive assist control even when an abnormality occurs during autonomous control.

BRIEF DESCRIPTION OF DRAWINGS

FIG. 6 A block view of a current control unit according to the first embodiment.

FIG. 8 A block view of a motor angle control unit according to the first embodiment.

FIG. 13 A block view of a motor angle control unit according to the third embodiment.

FIG. 14 A diagram of the vehicle steering system equipped with an electric power steering device according to a fourth embodiment.

FIG. 16 A diagram of the vehicle steering system equipped with an electric power steering device according to a fifth embodiment.

DESCRIPTION OF EMBODIMENTS

Hereinafter, embodiments of an electric power steering device according to the present disclosure are explained with reference to the drawings.

First Embodiment

Figure 1:
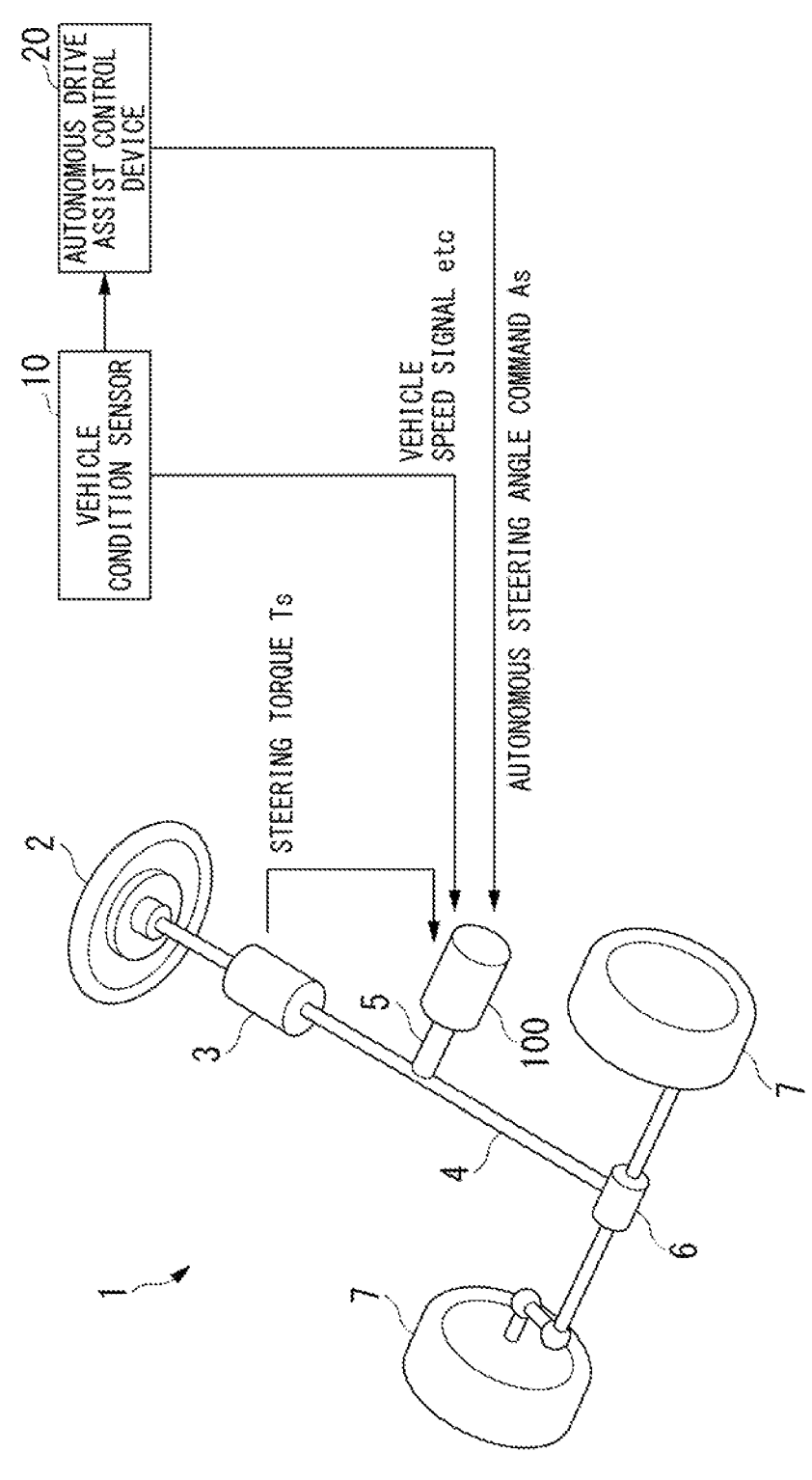
FIG. 1 A diagram of a vehicle steering system equipped with an electric power steering device according to a first embodiment.

FIG. 1 is a diagram of a vehicle steering system equipped with an electric power steering device according to a first embodiment. As shown in FIG. 1, an electric power steering device 1 according to the first embodiment includes a torque sensor 3, a steering shaft 4, a reducer 5, a rack and pinion gear 6, a vehicle condition sensor 10, autonomous drive assist control device 20 (autonomous drive assist controller), and a motor control unit 100. The electric power steering device 1 has an autonomous drive assist control, and maintains vehicle autonomous even when an abnormality occurs.

The torque sensor 3 detects a steering torque Ts that is generated in the steering shaft 4 when a vehicle operator steers a steering wheel 2. The torque sensor 3 is for example provided in the steering shaft 4. The torque sensor 3 is connected to the motor control unit 100, and outputs the steering torque Ts to the motor control unit 100.

The steering shaft 4 has an end that is linked to the steering wheel 2, and another end that is linked to the rack and pinion gear 6. The steering shaft 4 rotates as a single entity with the steering wheel 2.

The reducer 5 increases motor torque from the motor control unit 100 according to a reduction ratio of a combination of gears. The reducer 5 transmits the increased motor torque to the steering shaft 4.

To control vehicle steering operation, the motor control unit 100 includes a control unit and an electric motor. Motor torque from the motor control unit 100 is provided to the steering shaft 4 via the reducer 5, along with the steering torque from the vehicle operator. The motor torque and the steering torque that are provided to the steering shaft 4 are transmitted to tires 7 via the rack and pinion gear 6, so that vehicle steering is conducted.

The vehicle condition sensor 10 is electrically connected to the motor control unit 100. The vehicle condition sensor 10 detects vehicle condition of an autonomous vehicle, and detects information outside to the vehicle. The vehicle condition sensor 10 is for example, a variety of sensors that detect surroundings of the autonomous vehicle, and that measure a state of motion of the autonomous vehicle. The surroundings of the autonomous vehicle are just an example of information outside to the autonomous vehicle. The state of motion of the autonomous vehicle is just an example of the vehicle condition.

The vehicle condition sensor 10 for example, has a first sensor that detects information of the surroundings of the autonomous vehicle, and a second sensor to measure the state of motion of the autonomous vehicle. The first sensor for example, includes an image sensor and a radar sensor. The second sensor for example, includes a vehicle speed sensor, a yaw rate sensor, a lateral acceleration, and a steering angle sensor. The vehicle condition sensor 10 outputs the information of the surroundings (hereinafter referred to as "surrounding information") detected by the first sensor, and information of the state of motion of the autonomous vehicle (hereinafter referred to as "vehicle condition information") measured by the second sensor to the autonomous drive assist control device 20. The vehicle condition sensor 10 outputs the vehicle condition information (for example, speed signal or the like) to the motor control unit 100.

The autonomous drive assist control device 20 conducts autonomous drive assist control that is a control for having an autonomous vehicle travel along a target trajectory. The autonomous drive assist control for example, is a route-follow control, lane deviation suppression control, parking-assist system or the like. The autonomous drive assist control device 20 generates an autonomous steering angle command As as a target value of the steering operation of the vehicle based on information from the vehicle condition sensor 10, so as to autonomously operate vehicle steering, and have the vehicle autonomously travel.

As an example of route-follow control for example, the autonomous drive assist control device 20 measures a center location in a width direction of a road that is subdivided with lane lines based off of travel road width, which is one of the surrounding information values that is obtained from the first sensor (image sensor and radar sensor). The autonomous drive assist control device 20 then generates the autonomous steering angle command As so as to have the autonomous vehicle follow a target travel line, based on a set value of the target travel line, a lateral position of the autonomous vehicle with respect to a lane that is measured by the image sensor, and the vehicle information measured at the second sensor (the vehicle speed sensor, the yaw rate sensor, the lateral acceleration, and the steering angle sensor).

As an example of lane deviation suppression control, similar to the example of route-follow control, the autonomous drive assist control device 20 detects the surrounding information from the road, subdivided with lane lines, which is being traveled on, and generates the autonomous steering angle command As so as to suppress deviation to another lane from the lane being traveled on.

Figure 2:
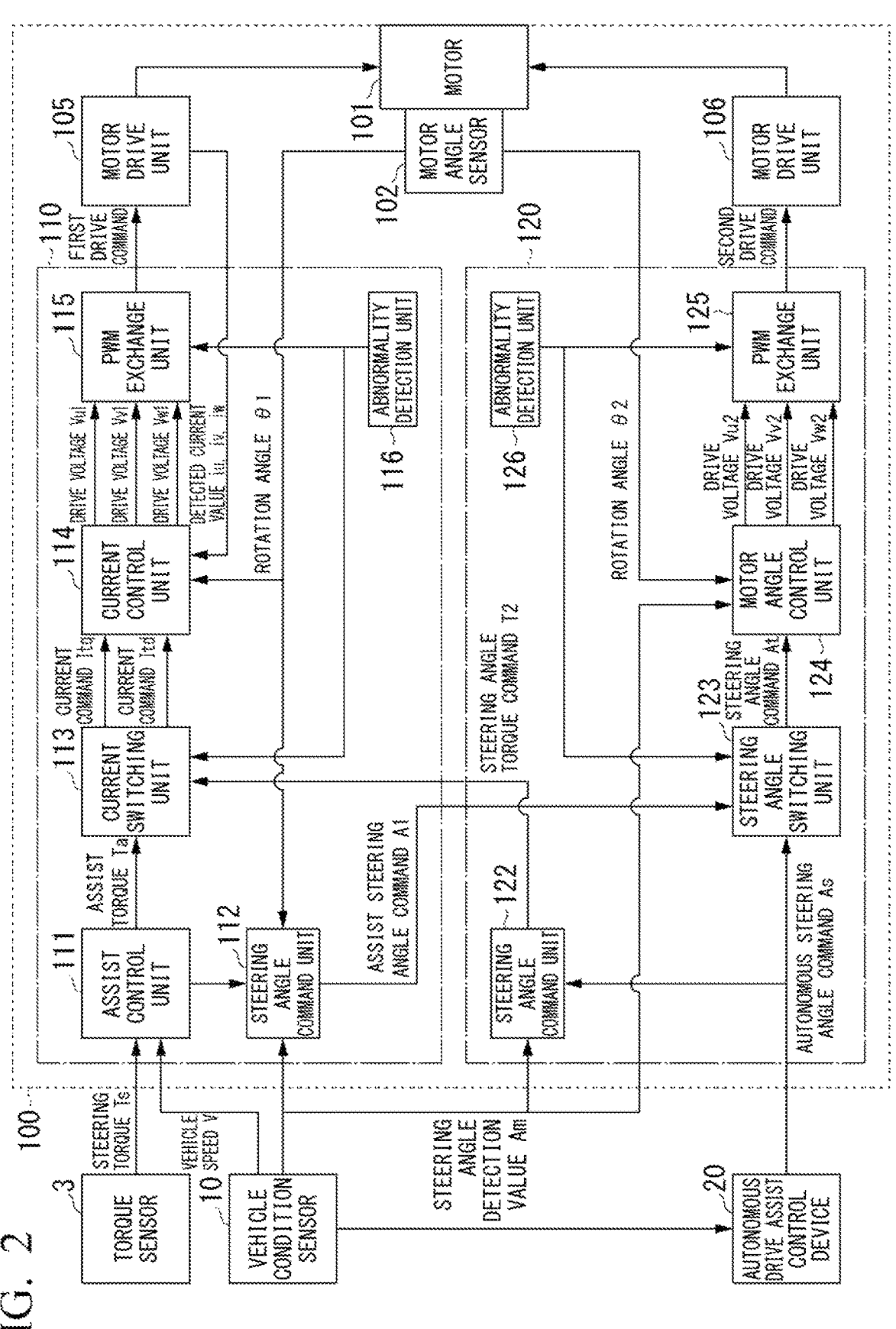
FIG. 2 A block diagram of a motor control according to the first embodiment.

FIG. 2 is a block diagram of the motor control unit 100 according to the first embodiment. As shown in FIG. 2, the motor control unit 100 includes a motor 101, a motor angle sensor 102, a motor drive unit 105, 106, a first CPU 110 (a first motor controller), and a second CPU 120 (a second motor controller).

The motor 101 is a motor that is rotated to obtain the steering angle. The motor 101 has three phase windings U1, V1, W1, and three phase windings U2, V2, and W2. The motor 101 for example, may be a permanent magnet synchronous motor, an induction motor, a synchronous reluctance motor or the like, and need not only be two motors that have three phases, but motors that have multiple phases, or two pole two pair brushed motors. It is possible to use distributed winding or concentrated winding for the motor windings of the motor 101.

The motor 101 may be a tandem motor having two stators. There is also no need for the windings of the two of motors to be the same, and the windings may be of differing specifications. So long as the motor 101 is a configuration capable of outputting a desired rotation angle and torque, the motor 101 may be one set of windings, or may be two sets of windings in conjunction. Below, a case where the motor 101 is a non-salient pole type permanent magnet synchronous motor, in other words, a three phase brushless motor having a U phase winding, a V phase winding, and a W phase winding is explained.

The motor angle sensor 102 detects an output rotation angle θ of the motor 101 as θ1 (=θ), and θ2 (=θ2). The motor angle sensor 102 outputs a detected rotation angle θ1 to the first CPU 110 to be mentioned later on, and outputs a detected rotation angle θ2 to the second CPU 120 to be mentioned later on. Although the motor angle sensor 102 is listed as a single sensor, it is possible to dispose two redundant angle sensors that are each made to independently conduct input into the first CPU 110 and the second CPU 120. Although examples of the motor angle sensor 102 include a resolver, an encoder, or a magnetic sensor, so long as the sensor detects the rotation angle of the motor 101, the sensor is not limited thereto. There are cases below where the rotation angle of the motor 10 is referred to as the "motor angle".

Figure 3:
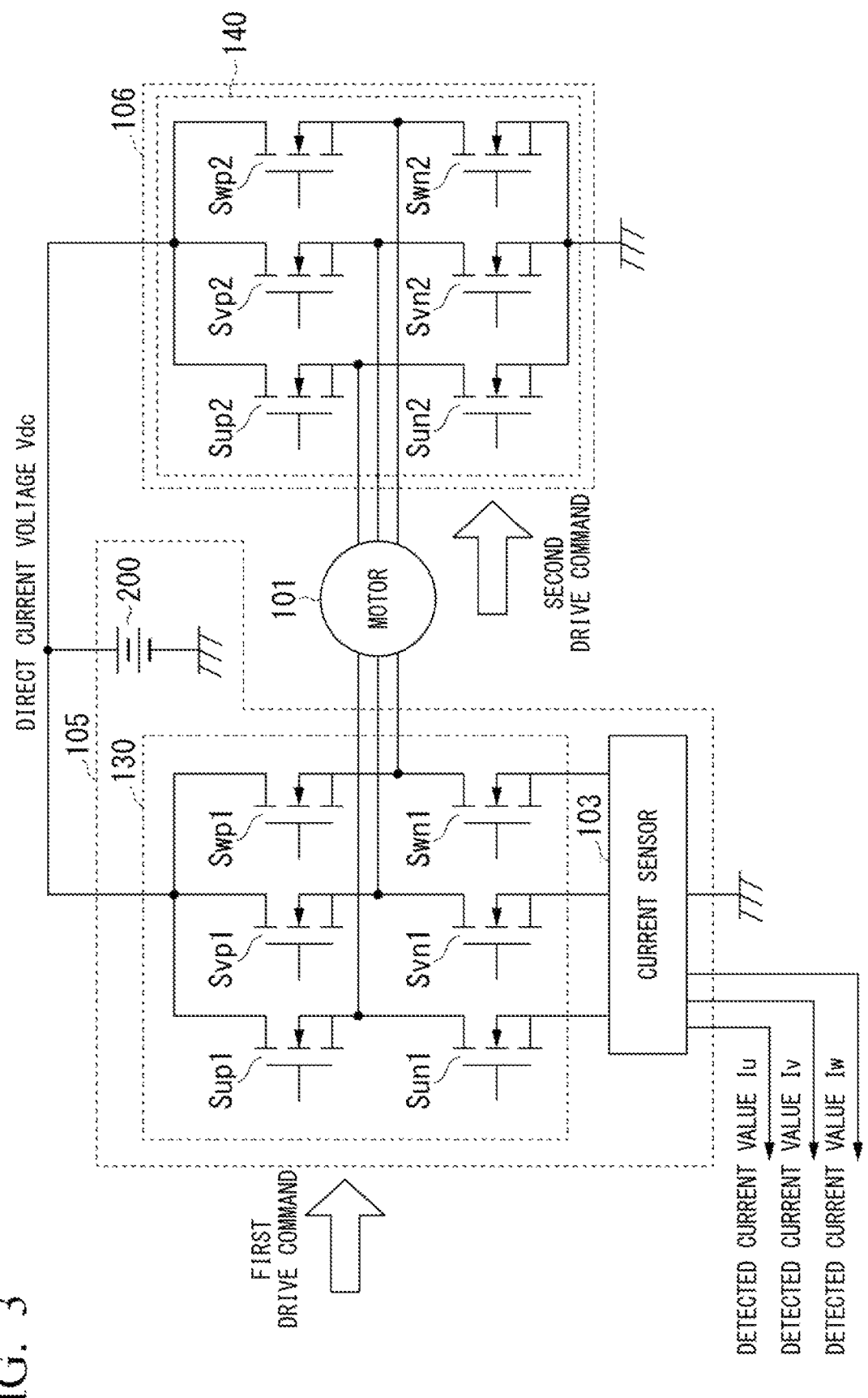
FIG. 3 A schematic outline diagram of a motor drive unit and a motor drive unit according to the first embodiment.

FIG. 3 is a schematic outline diagram of the motor drive unit 105 and the motor drive unit 106 according to the first embodiment. As shown in FIG. 3, the motor drive unit 105 includes a current sensor 103, an inverter circuit 130, and a direct current power supply source 200.

The current sensor 103 detects the currents flowing through various phases of the motor 101, and outputs detected current values of the various phases iu, iv, and iw. The current sensor 103 outputs the detected current values of the various phases iu, iv, and iw to the first CPU 110. A CT sensor that uses a magnetic flux generated when measuring current or a sensor that uses resistive elements for current detection or the like may be mentioned as examples of the current sensor 103, and so long as it is possible for the sensor to detect the current values of the various phases, the current sensor 103 is not limited to any type of sensor. Although the current sensor 103 shown in FIG. 3 is connected in series to lower arm switching elements of the inverter circuit 130, the current sensor 103 is not limited to the position shown in FIG. 3. So long as it is possible to detect currents that flow through the various phases of the motor 101, the current sensor 103 may be disposed in any position.

The direct current power supply source 200 generates a direct current voltage Vdc. The direct current power supply source 200 may be a battery that is equipped in the vehicle, and the direct current voltage Vdc may be generated by stepping up or stepping down the power supply from the battery.

The inverter circuit 130 applies voltage to the three phase windings U1, V1, W1 of the motor 101 where a PWM modulates with a carrier cycle Tc1 and a duty that corresponds to a first drive command, based on the first drive command generated at the first CPU 110, and the direct current voltage Vdc from the direct current power supply source 200.

Switching elements Sup1 to Swn1 are for example, semi-conductor switching elements such as an IGBT (Insulated Gate Bipolar Transistor), a bipolar transistor, a MOS (Metal Oxide Semiconductor) power transistor or the like. By conducting switching operation based off of the first drive command, the switching elements Sup1 to Swn1 apply a desired voltage to the motor 101.

As shown in FIG. 3, the motor drive unit 106 includes an inverter circuit 140. As shown in FIG. 3, the inverter circuit 140 has the direct current voltage Vdc from the direct current power supply source 200 applied. The inverter circuit 140 is not limited thereto however, and the motor drive unit 106 may have a direct current power supply that differs from the direct current power supply source 200. In other words, the direct current power supply source 200 is made to be a direct current power supply for the motor drive unit 105, and a direct current power supply different from the direct current power supply source 200 is provided, so that the differently provided direct current power supply is the direct current power supply that supplies the motor drive unit 106.

The inverter circuit 140 applies voltage to the three phase windings U2, V2, W2 of the motor 101 where a PWM modulates with a carrier cycle Tc2 and a duty that corresponds to a second drive command, based on the second drive command generated at the second CPU 120, and the direct current voltage Vdc from the direct current power supply source 200. Switching elements Sup2 to Swn2 are semi-conductor switching elements similar to the switching elements Sup1 to Swn1. By conducting switching operation based off of the second drive command, the switching elements Sup2 to Swn2 apply a desired voltage to the motor 101. To control feedback of the rotation angle of the motor 101, no current sensor is provided in the motor drive unit 106.

By controlling drive of the motor 101, the first CPU 110 conducts steering assist control to assist steering based on detection results of the torque sensor 3. The steering torque Ts detected by the torque sensor 3 and the vehicle speed V detected by the vehicle speed sensor, which is an example of the vehicle condition sensor 10, is input into the first CPU 110. Hereinafter, FIG. 2 is used to explain a configuration of the first CPU 110. Data exchange between the first CPU 110 and the second CPU 120 is possible by data transmission, and in the example of FIG. 2, an assist torque Ta and a steering angle torque command T2 are exchanged. The assist torque Ta is an example of a first command. The steering angle torque command T2 is an example of a second command.

As shown in FIG. 2, the first CPU 110 includes an assist control unit 111, a steering angle command unit 112, a current switching unit 113, a current control unit 114, a PWM exchange unit 115, and an abnormality detection unit 116.

Figure 4:
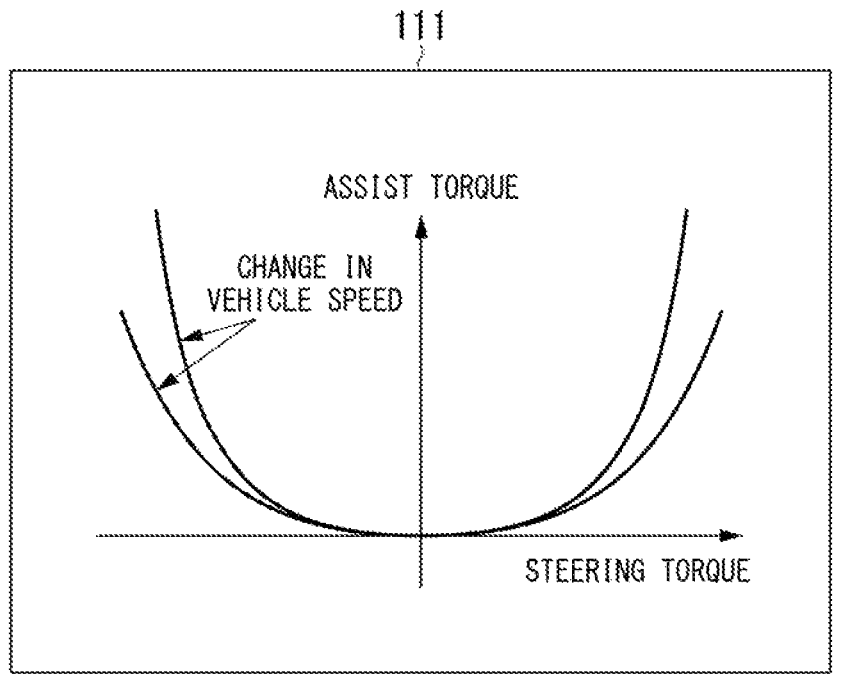
FIG. 4 A view that explains a map of vehicle speed and steering torque according to the first embodiment.

The assist control unit 111 calculates the assist torque Ta that needs to be provided to the steering shaft 4 based on the steering torque Ts and the vehicle speed V. As shown in FIG. 4, the assist control unit 111 for example calculates the assist torque Ta from the map of the vehicle speed V and the steering torque Ts. The assist control unit 111 is not limited to the above in calculating the assist torque Ta, and well known technology may be used to calculate the assist torque Ta based on the vehicle speed V and the steering torque Ts.

The steering angle command unit 112 obtains a steering angle detection value Am from the assist torque Ta calculated from the assist control unit 111, and the steering angle sensor which is an example of the vehicle condition sensor 10. The steering angle detection value Am is the value of the detected steering angle in an actual condition of steering. The steering angle command unit 112 calculates an assist steering angle command A1 based on the assist torque Ta and the steering angle detection value Am. The assist steering angle command A1 is a target value (target steering angle), and is an example of the first command.

Figure 5:
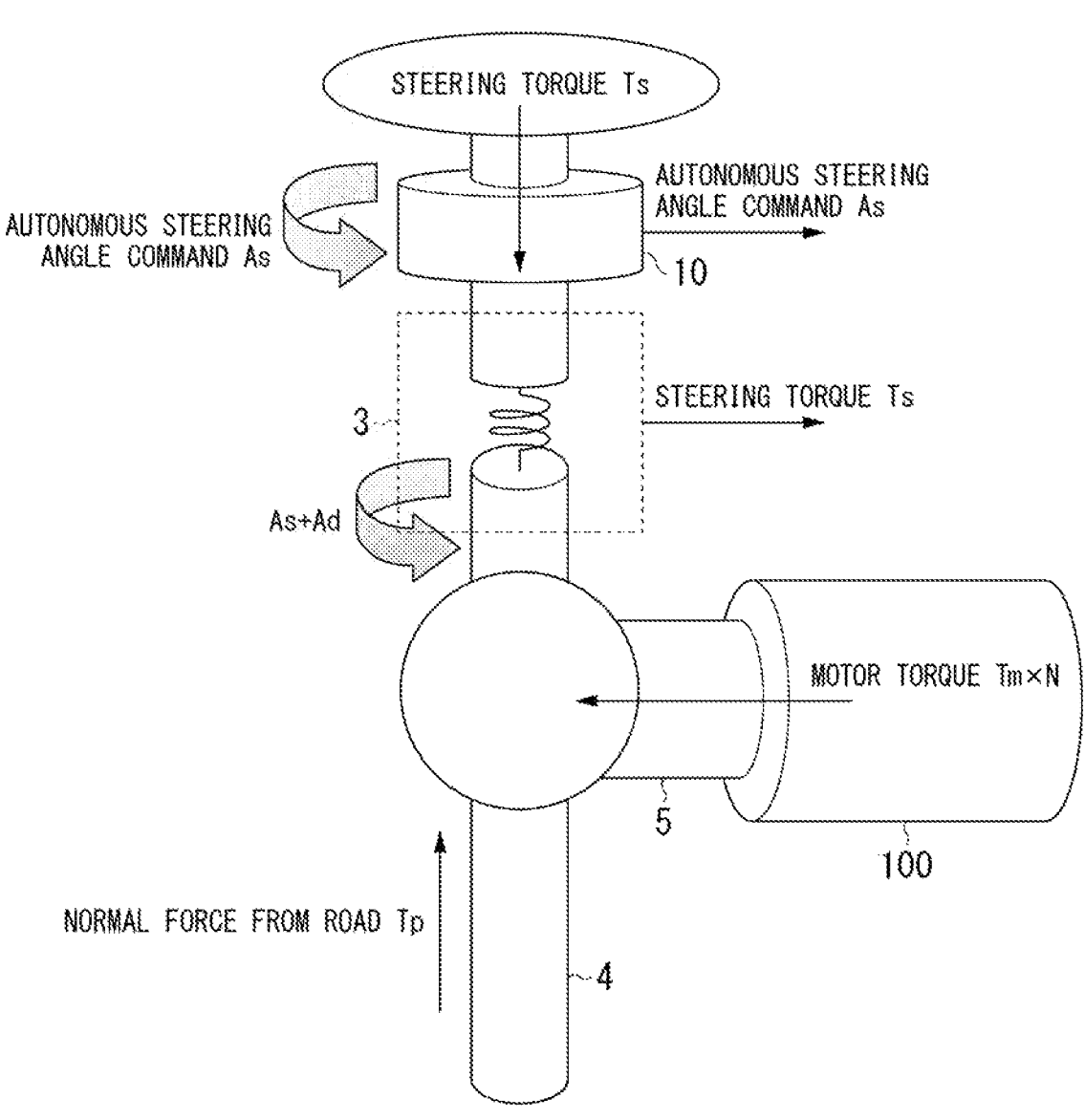
FIG. 5 A view that explains a generation method of steering assist angle command according to the first embodiment.

As shown in FIG. 5, the Ts detected by the torque sensor 3 is proportional to a twist angle Ad of the steering wheel 2 and the steering shaft 4 from a torsion bar, and a torsion spring rate k. The twist angle Ad is an angle deviation of the steering angle As, which is an angle of the steering wheel 2, and the steering shaft 4. Therefore, the steering torque Ts is shown in the following equation (1).

$$Ts = k \times Ad \qquad (1)$$

At such time, a relationship of the steering torque Ts and a result of a sum of a motor torque Tm1 and motor torque Tm2 multiplied by a reduction ratio N, with a road surface reaction force Tp transmitted from the tires 7 is shown in the following equation (2). The motor torque Tm1 is the motor torque of the motor 101 that is driven by the motor drive unit 105. The motor torque Tm2 is the motor torque of the motor 101 that is driven by the motor drive unit 106.

$$Ts + N(Tm1 + Tm2) = Tp \qquad (2)$$

When outputting the motor torque Tm2 shown in the following equation (3), equation (2) is expressed as shown in equation (4).

$$N \times Tm2 = Ts \qquad (3)$$

$$2Ts + N \times Tm1 = Tp \qquad (4)$$

Compared to when the motor torque Tm1 is only output at the motor drive unit 105, when outputting the motor torque Tm2 as in equation (3), the steering torque Ts, which is an input to the assist control unit 111 is input as ½ Ts, and it is possible to make the assist torque Ta smaller. At such time, the assist steering angle command A1 is expressed as is shown as the following equation (5), from equations (1) and (3). For example, the steering angle command unit 112 calculates the assist steering angle command A1. The steering angle command unit 112 sends the calculated assist steering angle command A1 to the second CPU 120.

$$A1 = Ts/k + Am \qquad (5)$$

The current switching unit 113 obtains the assist torque Ta from the assist control unit 111. The current switching unit 113 obtains the steering angle torque command T2 from the second CPU 120. The current switching unit 113 selects one of the assist torque Ta and the steering angle torque command T2. For example, in a steering state where steering assist control is conducted as the vehicle operator is steering, the current switching unit 113 selects the assist torque Ta out of the assist torque Ta and the steering angle torque command T2. In a state of autonomous drive assist where the autonomous steering angle command As is generated from the autonomous drive assist control device 20 based on information from the vehicle condition sensor 10, the current switching unit 113 selects the steering angle torque command T2 out of the assist torque Ta and the steering angle torque command T2.

The current switching unit 113 calculates a current command Itq which is a target current of a q-axis, and a current command Itd which is a target current of a d-axis as a current command to suppress an increase of the induced voltage of the motor, based on the selected assist torque Ta or the steering angle torque command T2. The current command Itd of the d-axis may be generated by a well-known control, and for example may be generated based on a maximum torque/current (MTPA) control.

The current control unit 114 obtains the current commands Itd and Itq which are target current values of the dq axes from the current switching unit 113. The current control unit 114 obtains the detected current values iu, iv, and iw from the current sensor 103. The current control unit 114 converts the detected current values iu, iv, and iw to detected current values Id and Iq of the dq axes. The current control unit 114 conducts typical vector control that calculates a drive command based on the current commands Itd and Itq of the dq axes, and the detected current values Id and Iq of the dq axes.

Figure 6:
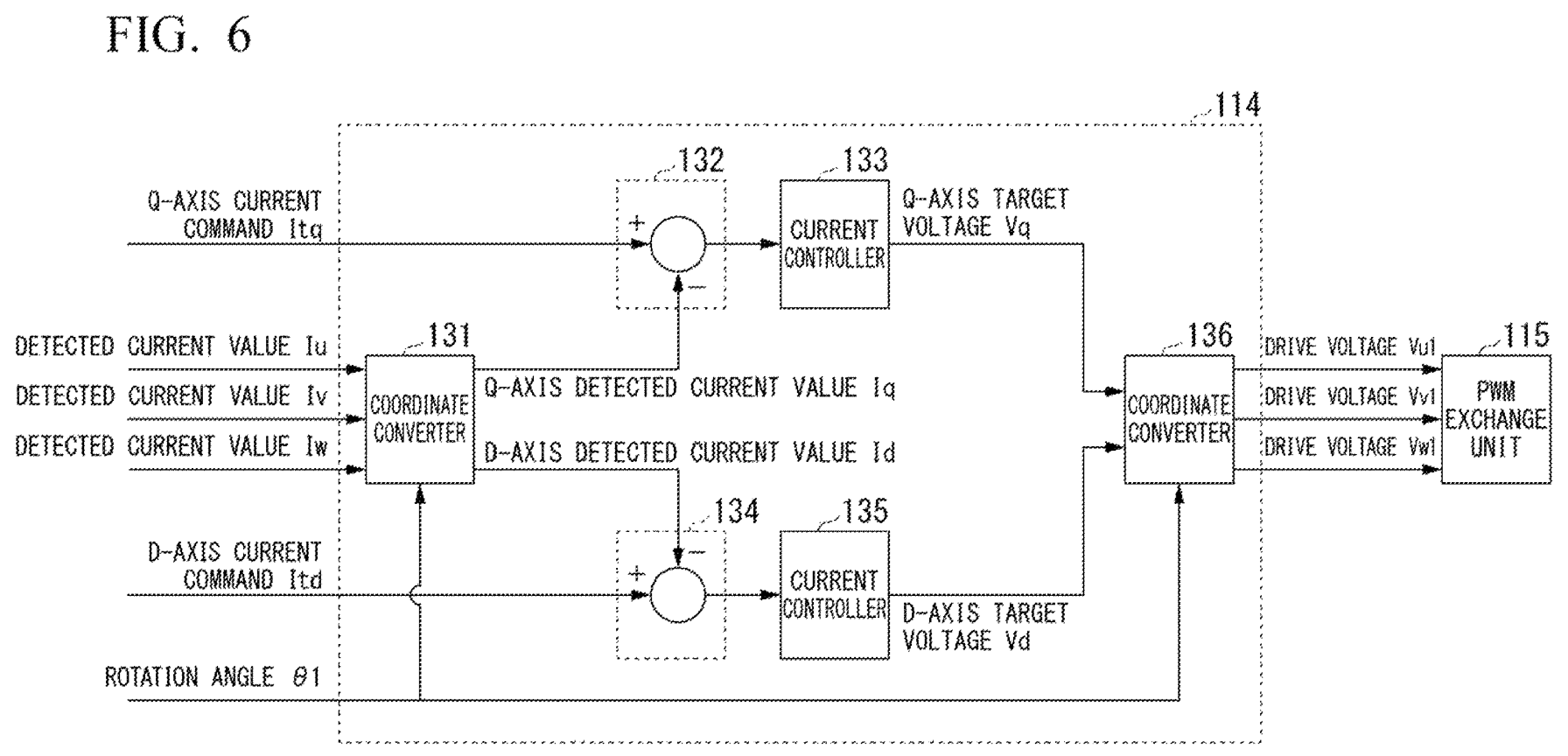

FIG. 6 is a block view of a current control unit 114 according to the first embodiment. The current control unit 114 includes a coordinate converter 131, variance calculator 132, a current controller 133, a variance calculator 134, a current controller 135, and a coordinate converter 136.

The coordinate converter 131 obtains the detected current value Id of the q-axis and the detected current value Iq of the d-axis by conducting coordinate conversion to two phase at the detected current values Iu, Iv, and Iw of the three phases of the motor 101, based on the rotation angle θ1 detected at the motor angle sensor 102. The coordinate converter 131 outputs the detected current value Iq of the q-axis to the variance calculator 132, and the detected current value Id of the d-axis to the variance calculator 134.

The variance calculator 132 calculates a variance of the current command Itq of the q-axis and the detected current value Iq of the q-axis, and outputs the variance calculated to the current controller 133. The variance calculator 134 calculates the variance of the current command Itd of the d-axis and the detected current value Id of the d-axis, and outputs the variance calculated to the current controller 135.

The current controller 133 calculates a target voltage Vq of the q-axis that is to become a drive command, based on the variance that is output from the variance calculator 132. The current controller 133 outputs the target voltage Vq to the coordinate converter 136. The current controller 135 calculates a target voltage Vd of the d-axis that is to become a drive command, based on the variance that is output from the variance calculator 134. The current controller 133 outputs the target voltage Vd to the coordinate converter 136.

The coordinate converter 136 converts coordinates of the target voltages Vd and Vq of the dq axes to three phase drive voltages Vu1, Vv1, and Vw1, based on the rotation angle θ1. The coordinate converter 136 outputs the drive voltages Vu1, Vv1, and Vw1 to the PWM exchange unit 115.

The current controller 133 is a controller that conducts feedback control so that the variance between the current command Itq of the q-axis and the detected current value Iq is 0. The current controller 135 is a controller that conducts feedback control so that the variance between the current command Itd of the d-axis and the detected current value Id is 0. As current controllers 133 and 135, typical proportional integral controls used for motor control may be used, or controllers that freely combine well-known proportional controls, integral controls, and differential controls may be used. Other well-known controllers may also be used, and a plurality of well-known controllers may be used in combination.

As a well-known pulse width modulator, the PWM exchange unit 115 controls the switching elements Sup1 to Swn1 so as to be in an ON state or an OFF state by outputting the first drive command of the duty ratio to the switching elements Sup1 to Swn1, according to the carrier cycle Tc1 and the drive voltages Vu1, Vv1, and Vw1.

The second CPU 120 conducts autonomous drive assist control that conducts autonomous steering of the steering by drive control of the motor 101, according to the autonomous steering angle command As. The second CPU 120 includes a steering angle command unit 122, a steering angle switching unit 123, a motor angle control unit 124, a PWM exchange unit 125, and an abnormality detection unit 126.

Figure 7:
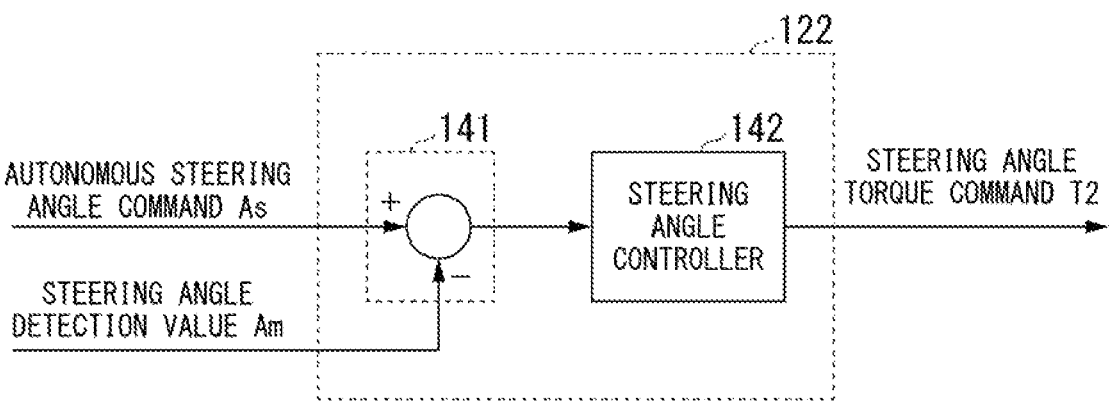
FIG. 7 A block view of a steering angle command unit according to the first embodiment.

FIG. 7 is a block view of the steering angle command unit 122 according to the first embodiment. The steering angle command unit 122 generates the steering angle torque command T2 based on the autonomous steering angle command that the autonomous drive assist control device 20 generates, and the steering angle detection value Am in an actual state of steering from the vehicle condition sensor 10. As shown in FIG. 7, the steering angle command unit 122 includes a variance calculator 141, and a steering angle controller 142.

The variance calculator 141 calculates a variance of the autonomous steering angle command As and the steering angle detection value Am. The variance calculator 141 outputs the variance calculated to the steering angle controller 142. The steering angle controller 142 is a controller that conducts feedback control so as to generate a steering angle torque command T2 that causes the variance between the autonomous steering angle command As and the steering angle detection value Am to be 0. The steering angle torque command T2 is a target value of the motor torque that causes the variance of the autonomous steering angle command As and the steering angle detection value Am to be 0. As the steering angle controller 142, a controller that freely combines a well-known typical proportional integral control, a proportional control, an integral control, and a differential control may be used. Other well-known controllers may also be used, and a plurality of well-known controllers may be used in combination.

The steering angle switching unit 123 obtains the autonomous steering angle command As from the autonomous drive assist control device 20, and obtains the assist steering angle command A1 from the steering angle command unit 112. In a steering state, the steering angle switching unit 123 selects the assist steering angle command A1 as a steering angle command At, out of the autonomous steering angle command As and the assist steering angle command A1. The steering angle command At is a command value of the rotation angle of the motor 101. The steering angle switching unit 123 selects the autonomous steering angle command As as the steering angle command At out of the autonomous steering angle command As and the assist steering angle command A1, in a state of autonomous drive assist when conducting autonomous drive assist control based on information from the vehicle condition sensor 10. The steering angle switching unit 123 outputs the steering angle command At to the motor angle control unit 124.

Figure 8:
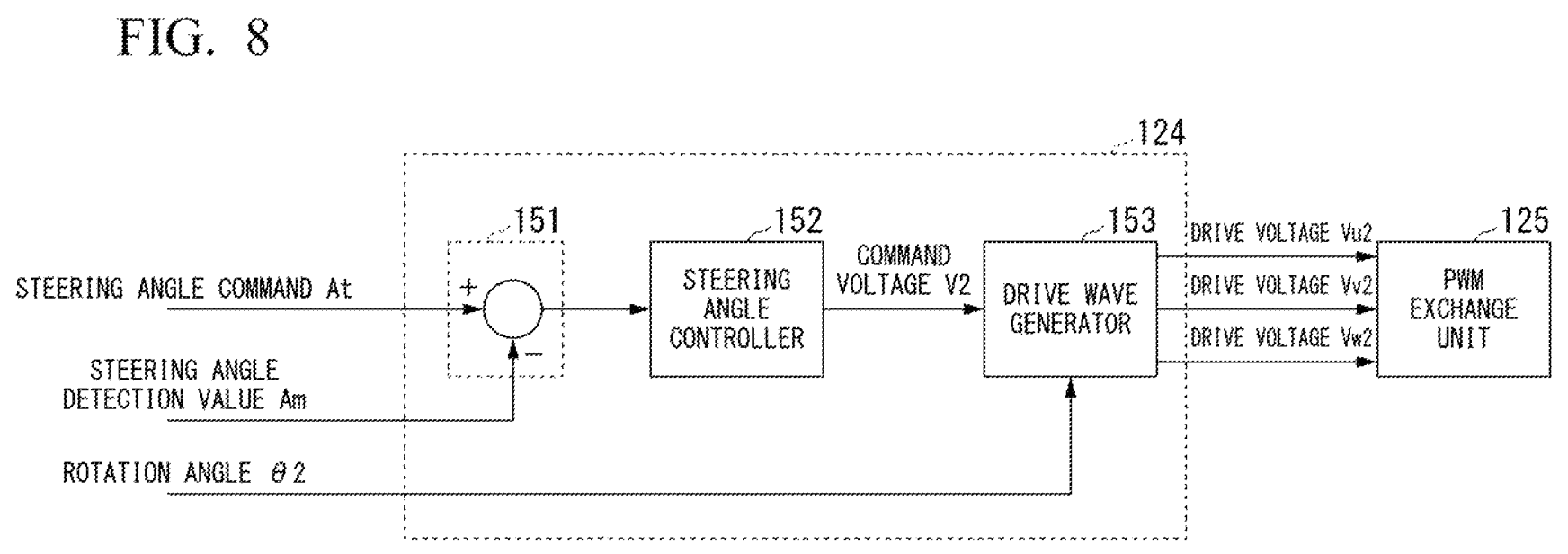

FIG. 8 is a block view of the motor angle control unit 124 according to the first embodiment. The motor angle control unit 124 includes a variance calculator 151, a steering angle controller 152, and a drive wave generator 153.

The variance calculator 151 calculates a variance between the steering angle command At output from the steering angle switching unit 123, and the steering angle detection value Am from the steering angle sensor of the vehicle condition sensor 10. The variance calculator 151 outputs the calculated variance to the steering angle controller 152.

The steering angle controller 152 is a controller that conducts feedback control for generating a command voltage V2 that causes the variance between the steering angle command At and the steering angle detection value Am to be 0. As the steering angle controller 152, a controller that freely combines a well-known typical proportional integral control, a proportional control, an integral control, and a differential control may be used. Other well-known controllers may also be used, and a plurality of well-known controllers may be used in combination.

The drive wave generator 153 outputs the command voltage V2 that is changed to three phase drive voltages Vu2, Vv2, and Vw2 to the PWM exchange unit 125 so that the motor torque is a maximum, based on the command voltage V2 and the rotation angle θ2. At such time, in order to have the motor 101 rotate to an instructed angle, the drive voltages Vu2, Vv2, and Vw2 may be generated for example, although not shown on the drawings, a well-known advancement control that controls an induction voltage of the motor 101 and the position of the motor angle so that the maximum torque is drawn out of the motor 101 may be used.

By outputting the carrier cycle Tc2 and the drive voltages Vu2, Vv2, and Vw2 that correspond to the second drive command of the duty ratio to the switching elements Sup2 to Swn2, it is possible for the PWM exchange unit 125, as a well-known pulse width modulator, to control the switching elements Sup2 to Swn2 to the ON state or to the OFF state.

As shown in Patent Document 2, conventionally, when either of a steering angle control as the autonomous drive assist control, or when a steering assist control (assist control) is conducted during vehicle operator steering, the current command value is calculated based on the steering torque and on the vehicle speed, and current feedback control is conducted so as to have the current that flows to the motor become the current command value.

A responsiveness that is needed by the vehicle may be sufficiently low, since only a few Hz of the responsiveness exist during vehicle steering, and the responsiveness of the current that is determined by the characteristics of being electrically connected to the motor is greater than or equal to 100 Hz. Compared to current response, when the responsiveness is low during steering, the current feedback control is omitted, and it may be said that it is sufficient to have the steering angle feedback control follow a targeted steering angle. As such, by omitting the needed current detection as the current feedback control, it is possible to cost effectively configure the electric power steering device.

In Patent Document 2, when driving the motor so as to conduct steering assist control, or when driving the motor to conduct autonomous drive assist control, since only one system out of systems that drive the motor 101 is driving the motor, there are cases where the motor output is small. The electric power steering device 1 according to the present embodiment has two systems which drive the motor 101 as drive systems, and it is possible for one system to assist the other system in driving the motor, making it possible to obtain a larger motor output possible.

Although the electric power steering device disclosed in International Publication 2018/088465 has two independent drive motor circuits to conduct steering assist control, an input circuit of a torque sensor and a current sensor are needed in each the motor drive circuit. As shown in FIG. 2 of the present embodiment, an input circuit of the torque sensor 3 and current sensor 103 are only provided in one motor drive circuit, making it possible to cut down costs related to both devices.

Each of the motor drive circuits in International Publication 2018/088465 have a CPU mounted thereon, and each CPU requires the same amount of processing power. As compared to the first CPU 110, the second CPU 120 in the present embodiment does not have input from the torque sensor 3, the assist control unit 111, and the current control unit 114 that starts with torque detection. In other words, arithmetic processing of the second CPU 120 is simplified, compared to the first CPU 110. For this reason, the first CPU 110 and the second CPU 120 do not require the same amount of processing power, and the second CPU 120 which uses less processing power compared to the first CPU 110 may be adopted a CP Below, operation of when the motor drive circuit abnormalities, and details related thereto are explained as abnormal operation of the electric power steering device 1 according to the first embodiment.

The abnormality detection unit 116 detects an abnormality of a case where the motor drive unit 105 is not able to drive the motor 101 due to a number of reasons. Well-known technology may be used as a method of detecting the abnormality, as well as a method of determining the phase in which the abnormality has occurred, using the abnormality detection unit 116. Abnormalities where the motor drive unit 105 is not able to drive the motor 101 include abnormalities of the motor 101, abnormalities of the motor drive unit 105, abnormalities of the current sensor 103, abnormalities of the rotation angle θ1, abnormalities of when power is not supplied to the switching elements Sup1 to Swp1 from the direct current power supply source 200 and so on.

The abnormality detection unit 116 may determine that a certain phase does not have a current flowing through and is therefore malfunctioning for example, when a length of time that the detected current value of any one phase is 0 (zero) reaches a predetermined value. The abnormality detection unit 116 may conduct abnormality determination when the detected current value of the drive command of abnormality detection is output, using a potential difference between a high-potential side and a low-potential side of the switching elements Sup1 to Swn1.

When the abnormality detection unit 116 determines that motor drive is not possible, the first drive command from the PWM exchange unit 115 to the motor drive unit 105 is stopped. As such, it is possible to suppress the motor drive in a state where abnormality exists. Accordingly, when the abnormality detection unit 126 to be mentioned later on does not detect an abnormality, the motor drive unit 106 operates normally. Therefore, it is possible to continuously output the motor torque when steering assist control is conducted or the motor torque when autonomous drive assist control is conducted, from the motor drive unit 106. As such, when an abnormality occurs, it is possible to support vehicle operator steering, and it is possible to continue autonomous drive assist control.

The abnormality detection unit 126 detects an abnormality of a case where the motor drive unit 106 is not able to drive the motor 101 due to a number of reasons. Well-known technology may be used as a method of detecting the abnormality, as well as a method of determining the phase in which the abnormality has occurred, using the abnormality detection unit 126. Abnormalities where the motor drive unit 106 is not able to drive the motor 101 include abnormalities of the motor 101, abnormalities of the motor drive unit 106, abnormalities of the rotation angle θ2, abnormalities of when power is not supplied to switching elements Sup2 to Swp2 from the direct current power supply source 200 and so on.

The abnormality detection unit 126 for example, may detect a voltage that is supplied to the motor drive unit 106, and may detect a case when the aforementioned detected voltage does not match the second drive command. The abnormality detection unit 126 may detect direct current flowing to the motor drive unit 106, and may detect when an abnormality occurs due to the detected direct current being greater than or equal to the motor output.

When the abnormality detection unit 126 determines that motor drive is not possible, the second drive command from the PWM exchange unit 125 to the motor drive unit 106 is stopped. Accordingly, motor drive in a state of abnormality is suppressed. In such case, if no abnormality is detected by the abnormality detection unit 116, the motor drive unit 105 operates normally. Therefore, it is possible to continuously output the motor torque when conducting steering assist control, or the motor torque when conducting autonomous drive assist control from the motor drive unit 105. Accordingly, even when an abnormality occurs, it is possible to conduct steering assist control, and it is possible to continue conducting autonomous drive assist control.

Below, operation of when the command value exchanged between the first CPU 110 and the second CPU 120 is abnormal, and details related thereto are explained as abnormal operation of the electric power steering device 1 according to the first embodiment.

When the assist steering angle command A1 is not input to the second CPU 120 from the first CPU 110 due to an abnormality in the torque sensor 3, the vehicle condition sensor 10, and/or the first CPU 110, the abnormality detection unit 126 detects a generation abnormality. The assist steering angle command A1 not being input to the second CPU 120 shows that no assist steering angle command A1 is being generated at the first CPU 110. The abnormality detection unit 126 may detect a generation abnormality when it is not possible to receive the assist steering angle command A1 at the second CPU 120, or when the value of the assist steering angle command A1 is abnormal.

In a steering state, when the steering angle switching unit 123 determines that the assist steering angle command A1 detected by the abnormality detection unit 126 is abnormal, the steering angle switching unit 123 nullifies switching to the assist steering angle command A1, and it is possible to stop the second drive command from the PWM exchange unit 125 to the motor drive unit 106. As such, it is possible to suppress the motor drive in a state where abnormality exists.

In a state where the first CPU 110 is normal and only transmission from the first CPU 110 to the second CPU 120 is abnormal, since the first CPU 110 is normally operating, it is possible to output the first drive command to the motor drive unit 105. Accordingly, when only the transmission from the first CPU 110 to the second CPU 120 is abnormal, the first CPU 110 drives the motor 101, and it is possible to continue the steering assist control. For other abnormalities where the assist steering angle command A1 is not being generated such as abnormalities of the torque sensor 3, the steering sensor, or the first CPU 110, the motor drive is stopped. Still, the steering shaft 4 is joined from the steering wheel 2, and it is possible for the vehicle operator to steer the vehicle using manual steering.

In a state of autonomous drive assist, when the abnormality detection unit 126 determines that the assist steering angle command A1 is abnormal, the steering angle switching unit 123 nullifies switching to the assist steering angle command A1, and outputs the autonomous steering angle command As as the steering angle command At to the motor angle control unit 124. Accordingly, the second drive command is output to the motor drive unit 106 from the second CPU 120, and it is possible for the motor drive unit 106 to drive the motor 101 based on the second drive command. Therefore, it is possible to continue autonomous drive assist control even when the assist steering angle command A1 is abnormal.

The abnormality detection unit 116 detects an abnormality when the autonomous steering angle command As is not generated normally due to an abnormality of the vehicle condition sensor 10 or of the autonomous drive assist control device 20, or when the steering angle torque command T2 is not input to the first CPU 110 due to an abnormality of the steering angle sensor or the second CPU 120. When the autonomous steering angle command As is not generated normally, or when the steering angle torque command T2 is not input into the first CPU 110, the fact that it is not possible to generate the steering angle torque command T2 normally is shown in the second CPU 120. For example, the abnormality detection unit 116 may detect abnormality generation when it is not possible to receive the steering angle torque command T2 at the first CPU 110, or when the value of the steering angle torque command T2 is abnormal.

In a steering state, when the abnormality detection unit 116 determines that the steering angle torque command T2 is abnormal, the current switching unit 113 nullifies current switching to the steering angle torque command T2, and it is possible to output the assist torque Ta to the current control unit 114. Accordingly, the first CPU 110 drives the 101 by outputting the first drive command to the motor drive unit 105, and it is possible to continue steering assist.

In a state of autonomous drive assist control, when the abnormality detection unit 116 determines that the steering angle torque command T2 is abnormal, it is possible to conduct processing of the steering angle command unit 122 at the first CPU 110. By conducting processing of the steering angle command unit 122 at the first CPU 110, the steering angle torque command T2 is generated at the first CPU 110, and the current switching unit 113 selects the steering angle torque command T2 as the autonomous drive assist control and outputs the steering angle torque command T2 to the current control unit 114. Accordingly, the first drive command is output to the motor drive unit 105 from the first CPU 110, and the motor drive unit 105 drives the motor 101 based on the first drive command.

Accordingly, even when the abnormality detection unit 116 determines that the steering angle torque command T2 is abnormal, it is possible to continue support control during autonomous operation. When an abnormality occurs in the electric power steering device 1, it is possible to prioritize continuation of autonomous drive assist, rather than having the vehicle operator conduct steering.

The electric power steering device 1 according to the first embodiment explained above includes a first motor controller that commands the drive of the motor 101 according to a difference between a command value of a current being transmitted to the motor 101 and a current transmitted to the motor 101, and a second motor controller that commands the drive of the motor 101 according to a difference between the command value of the rotation angle of the motor 101 and the rotation angle of the motor 101.

When conducting steering assist control, the first motor controller assists motor drive at the second motor controller by sending a first command to the second motor controller in order to conduct drive control of the motor 101. When conducting autonomous drive assist control, the first motor controller assists drive of the motor 101 by drive control of the motor 101 based on a second command sent from the second motor controller to conduct drive control of the motor 101.

When conducting autonomous drive assist control, the second motor controller sends the second command to the first motor controller, and when steering assist control is being conducted, the second motor controller conducts drive control of the motor 101 based on the first command and assists drive of the motor 101.

Therefore, by either of the first motor controller or the second motor controller, it is possible to assist a motor torque of both the steering assist control and the autonomous drive assist control, along with assisting the motor 101 by the other motor controller when one of the first motor controller or the second motor controller is abnormal. In other words, it is possible to continue steering assist even when an abnormality occurs during steering assist control, and it is possible to continue autonomous drive assist even when an abnormality occurs during autonomous drive assist control.

Additional hardware when abnormalities occur is not needed when executing steering assist control and executing autonomous drive assist control, and by driving the motor 101 using two motor drive circuits, it is possible to increase the output of the motor 101 as a total by combining both outputs to the motor 101.

In the control method of International Publication No. 2016-199839, although it is possible to remedy an abnormality in a current command value which is a target value of the drive current flowing to the motor, the only remedy for such abnormality is carried out by changing the current command value. As such, in the control method of International Publication No. 2016-199839, a problem of not being able to remedy an abnormality that occurs in a motor drive unit that receives the current drive command and flows the drive current to the motor, or an abnormality of the motor that occurs exists.

In the control method of International Publication No. 2016-199839, no particular way of identifying in which component out of configuration components involved in generating the current command value did an abnormality occur, and a counter is simply allocated so as to control a yaw rate. As such, when an abnormality occurs, although it is possible to prevent vehicle behavior from destabilizing, no appropriate control in response to the abnormality is conducted, and a problem of not being able to continue autonomous drive assist where a target route is followed exists.

It is possible for the electric power steering device 1 according to the first embodiment to drive the motor 101 using the other motor controller even if one of the first motor controller or the second motor controller becomes abnormal. As such, it is possible to output torque that is as close to normal operation as can be from the motor 101, to continue autonomous assist drive, and to grant the vehicle operator peace of mind.

Second Embodiment

Figure 9:
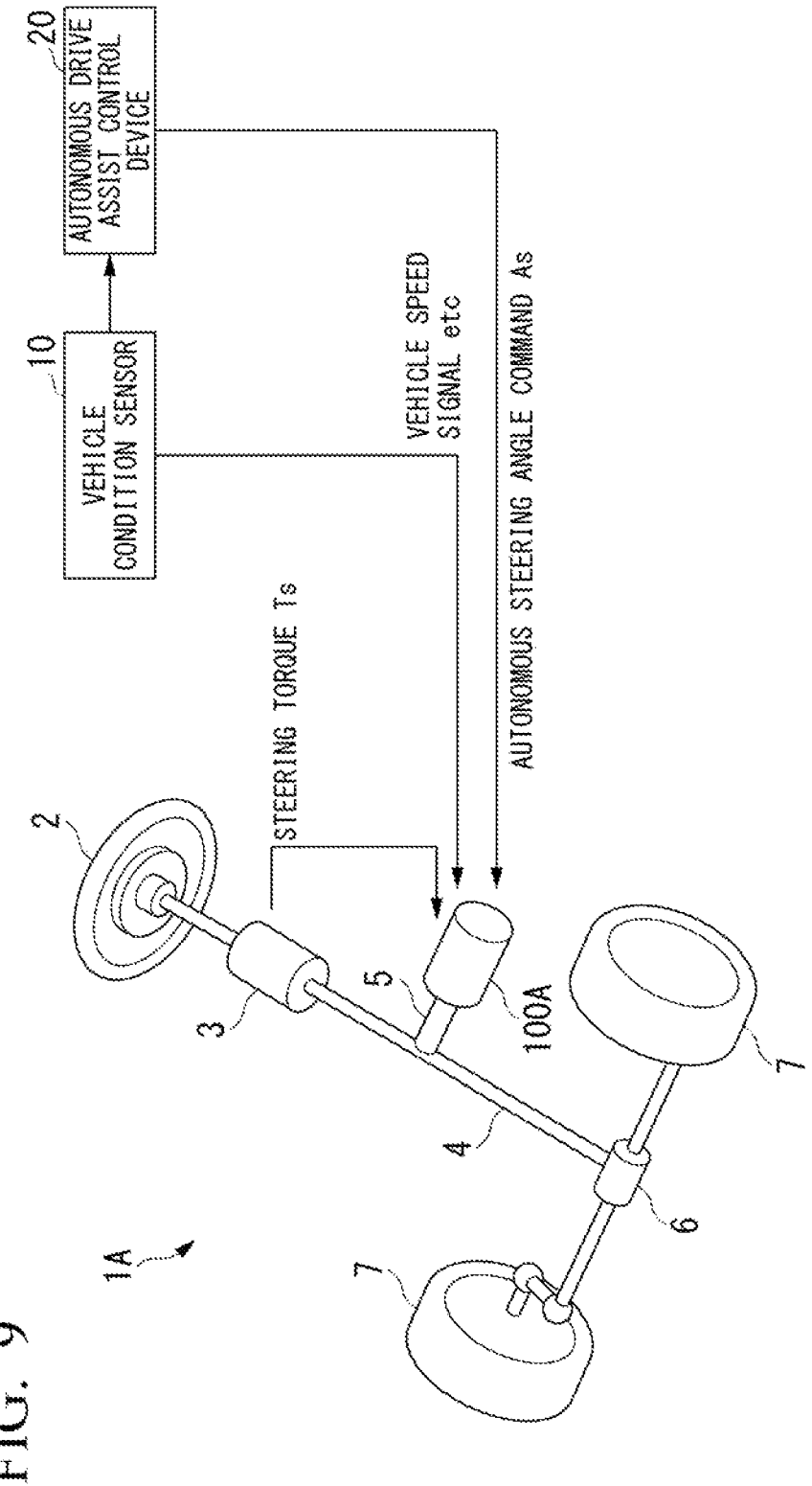
FIG. 9 A diagram of the vehicle steering system equipped with an electric power steering device according to a second embodiment.

An electric power steering device 1A according to a second embodiment is explained. FIG. 9 is a diagram of a vehicle steering system equipped with the electric power steering device 1A according to the second embodiment. The electric power steering device TA according to the second embodiment, when compared with the first embodiment, differs in an aspect of a steering angle detection value Am that is calculated using the steering angle sensor of the vehicle condition sensor 10 being held within a motor control unit 100A. Parts having similar functions as parts explained in the first embodiment have the same names and reference symbols affixed thereto, with detailed explanations being omitted in the explanations below.

The electric power steering device 1A includes the torque sensor 3, the steering shaft 4, the reducer 5, the rack and pinion gear 6, the vehicle condition sensor 10, the autonomous drive assist control device 20, and the motor control unit 100A. Similar to the first embodiment, the electric power steering device 1A has an autonomous drive assist control so as to continue autonomous drive assist even when an abnormality occurs.

Figure 10:
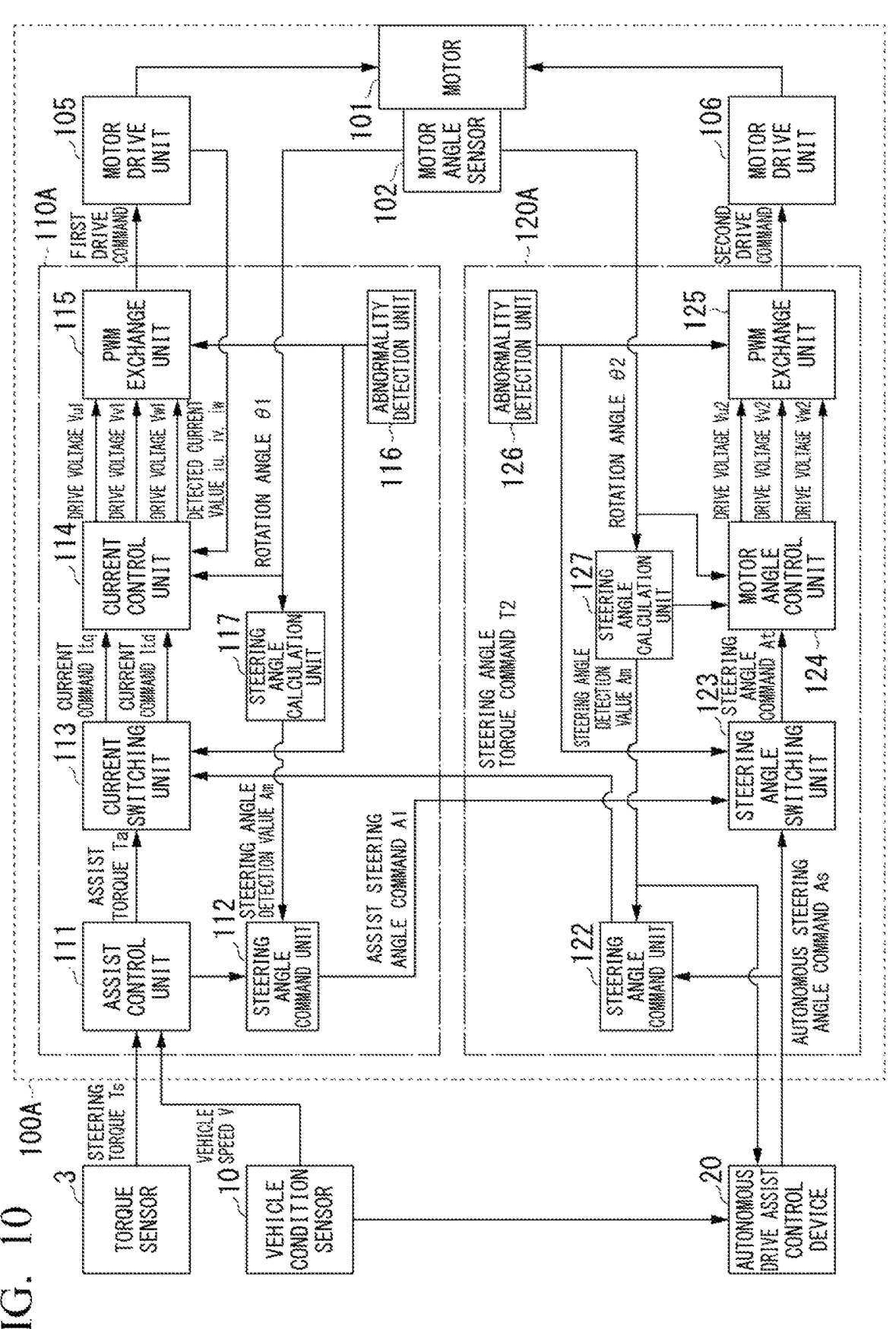
FIG. 10 A block diagram of the motor control according to the second embodiment.

FIG. 10 is a block diagram of the motor control unit 100A according to the second embodiment. As shown in FIG. 10, the motor control unit 100A includes the motor 101, the motor angle sensor 102, the motor drive unit 105, 106, a first CPU 110A (a first motor controller), and a second CPU 120A (a second motor controller).

The first CPU 110A includes the assist control unit 111, the steering angle command unit 112, the current switching unit 113, the current control unit 114, the PWM exchange unit 115, the abnormality detection unit 116, and a steering angle calculation unit 117.

The steering angle calculation unit 117 is connected to the motor angle sensor 102, and obtains the rotation angle θ1 from the motor angle sensor 102. The steering angle calculation unit 117 calculates the steering angle detection value Am by integrating the rotation angle θ1. The steering angle detection value Am is a value equivalent to the steering shaft 4 that is converted to a steering angle. The steering angle calculation unit 117 outputs the calculated steering angle detection value Am to the steering angle command unit 112.

The second CPU 120B includes the steering angle command unit 122, the steering angle switching unit 123, the motor angle control unit 124, the PWM exchange unit 125, the abnormality detection unit 126 and a steering angle calculation unit 127.

The steering angle calculation unit 127 is connected to the motor angle sensor 102, and obtains the rotation angle θ2 from the motor angle sensor 102. The steering angle calculation unit 127 calculates the steering angle detection value Am by integrating the rotation angle θ2. The steering angle calculation unit 127 outputs the calculated steering angle detection value Am to the steering angle command unit 122 and the motor angle control unit 124.

Other than achieving the same results as the results of first embodiment, it is possible to cheaply configure the device of the electric power steering device 1A according to the second embodiment explained above by having a configuration where the steering angle detection value Am is calculated from the motor angle of the motor angle sensor 102 along with the steering angle detection value Am calculated within the motor control unit 100, so that there is no need to provide an angle sensor outside of the motor control unit 100.

Third Embodiment

Figure 11:
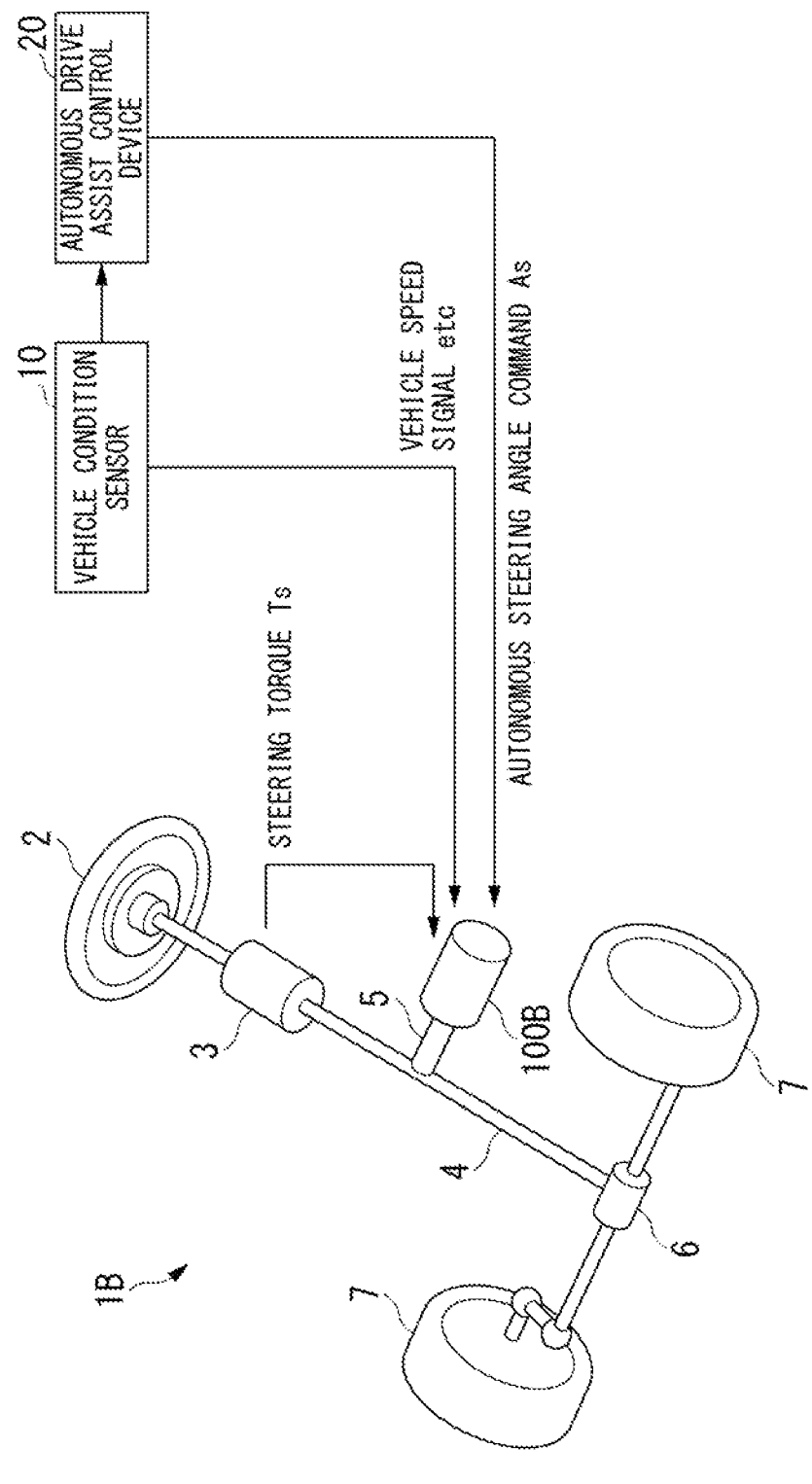
FIG. 11 A diagram of the vehicle steering system equipped with an electric power steering device according to a third embodiment.

An electric power steering device 1B according to a third embodiment is explained. FIG. 11 is a diagram of a vehicle steering system equipped with the electric power steering device 1B according to the third embodiment. The electric power steering device 1B according to the third embodiment, when compared with the second embodiment, differs in an aspect of steering angle control using a steering angle being replaced with motor angle control by a variance in motor angle. Parts having similar functions as parts explained in the first embodiment or in the second embodiment have the same names and reference symbols affixed thereto, with detailed explanations being omitted in the explanations below.

The electric power steering device 1B includes the torque sensor 3, the steering shaft 4, the reducer 5, the rack and pinion gear 6, the vehicle condition sensor 10, the autonomous drive assist control device 20 and a motor control unit 100B. Similar to the first embodiment, the electric power steering device 1B has an autonomous drive assist control, and is able to continue autonomous drive assist control even when an abnormality occurs.

Figure 12:
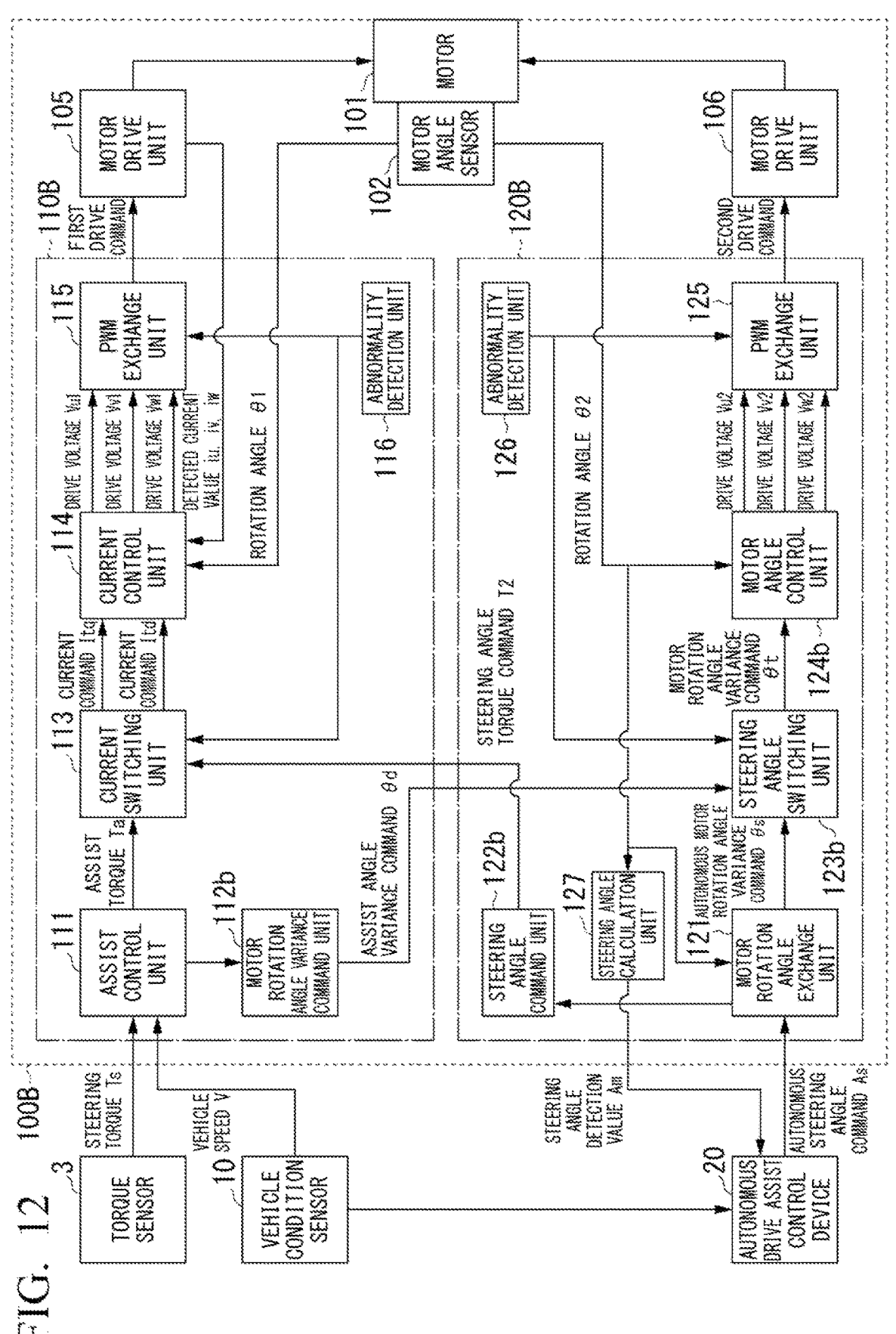
FIG. 12 A block diagram of the motor control according to the third embodiment.

FIG. 12 is a block diagram of a third motor control unit 100B according to the third embodiment. As shown in FIG. 12, the motor control unit 100B includes the motor 101, the motor angle sensor 102, the motor drive unit 105, 106, a first CPU 110B (a first motor controller), and a second CPU 120B (a second motor controller).

The first CPU 110B includes the assist control unit 111, a motor angle variance command unit 112b, the current switching unit 113, the current control unit 114, the PWM exchange unit 115, the abnormality detection unit 116, and the steering angle calculation unit 117. The second CPU 120B includes a motor angle exchange unit 121, a steering angle command unit 122b, a motor angle variance switching unit 123b, a motor angle control unit 124b, the PWM exchange unit 125, the abnormality detection unit 126, and the steering angle calculation unit 127.

The motor angle variance command unit 112b obtains the assist torque Ta calculated from the assist control unit 111. The motor angle variance command unit 112b informs the motor angle variance switching unit 123b of a rotation angle variance, in other words, a variance of a rotation angle that needs to be instructed, with respect to the rotation angle θ1 at some point, as an assist angle variance command Gd. The rotation angle that needs to be instructed is a target rotation angle. A relationship between a rotation angle θ (the assist angle variance command θd) and a motor torque T is expressed in equation (6).

[Math 1]

$$\theta = \frac{1}{s} \cdot \frac{1}{Jm \cdot s + Dm} T \tag{6}$$

Here, s is a differential operator, Jm is the moment of inertia, and Dm is a coefficient of viscous friction. The rotation angle θ shown in equation (6) is the target rotation angle needed to rotate a motor by outputting the assist torque Ta to the motor, with respect to the rotation angle θ1 at some point, and is the assist angle variance command θd. The motor angle variance command unit 112b uses the assist torque Ta obtained from the assist control unit 111 to calculate the assist angle variance command θd from equation (6). The motor angle variance command unit 112b outputs the calculated assist angle variance command θd to the motor angle variance switching unit 123b. The assist angle variance command is an example of a first variance.

The motor angle exchange unit 121 exchanges the autonomous steering angle command As output from the autonomous drive assist control device 20 to a rotation angle of the motor 101 by subtracting the autonomous steering angle command As from a reduction ratio. The motor angle exchange unit 121 calculates a variance between the exchanged rotation angle and the rotation angle θ2 input from the motor angle sensor 102 as an autonomous motor angle variance command θs. The motor angle exchange unit 121 outputs the calculated autonomous motor angle variance command θs to the steering angle command unit 122b and the motor angle variance switching unit 123b. The assist angle variance command (the first variance) is an example of the first command.

The steering angle command unit 122b generates the steering angle torque command T2 by conducting feedback control so that the autonomous motor angle variance command θs obtained from the motor angle exchange unit 121 is 0. The feedback control conducted at steering angle command unit 122b may be a well-known proportional control, an integral control, a differential control or any combination thereof. Other well-known controls may be used, and/or a plurality of well-known controls may be combined. The steering angle command unit 122b outputs the generated steering angle torque command T2 to the current switching unit 113.

The motor angle variance switching unit 123b selects one command out of either of the autonomous motor angle variance command θs from the motor angle exchange unit 121 or the assist angle variance command θd from the motor angle variance command unit 112b as the motor angle variance command θt. For example, the motor angle variance switching unit 123b selects the assist angle variance command θd as the motor angle variance command θt, when steering is conducted by the vehicle operator. The motor angle variance switching unit 123b for example, selects the autonomous motor angle variance command θs as the motor angle variance command θt, when autonomous drive assist is conducted.

Figure 13:
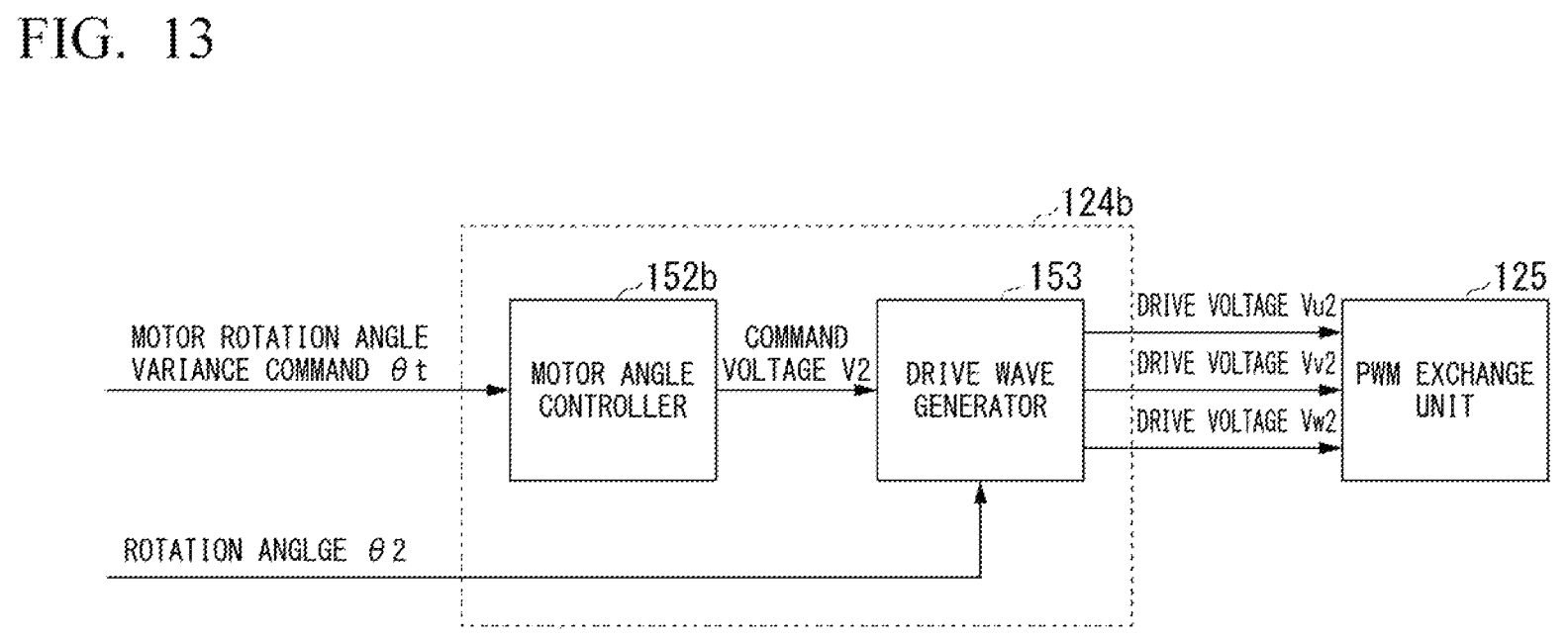

FIG. 13 is a block view of a motor angle control unit 124b according to the third embodiment. As shown in FIG. 13, the motor angle control unit 124b includes a motor angle controller 152b and the drive wave generator 153.

The motor angle controller 152b obtains the motor angle variance command θt from the motor angle variance switching unit 123b, and conducts feedback control to generate the command voltage V2 so that the obtained motor angle variance command θt becomes 0. The feedback control conducted at the 152b may be a well-known proportional control, an integral control, a differential control or any combination thereof. Other well-known controls may be used, and/or a plurality of well-known controls may be combined. The motor angle controller 152b outputs the generated command voltage V2 to the drive wave generator 153.

The drive wave generator 153 generates three phase voltages Vu, Vv, and Vw based on the command voltage V2 obtained from the drive wave generator 153 and the rotation angle θ2 obtained from the motor angle sensor 102, so that the motor torque is a maximum. The drive wave generator 153 outputs drive voltages Vu, Vv, and Vw to the PWM exchange unit 125. At such time, although not shown on the drawings, to have the motor angle move to the instructed angle in the motor 101, a well-known advancement control that controls an induction voltage of the motor 101 and the position of the motor angle so that the maximum torque is drawn out of the motor 101 may be used.

The steering angle calculation unit 127 is connected to the motor angle sensor 102, and obtains the rotation angle θ2 from the motor angle sensor 102. The steering angle calculation unit 127 calculates the steering angle detection value Am by integrating the rotation angle θ2. The steering angle calculation unit 127 transmits the steering angle detection value Am to the autonomous drive assist control device 20 instead of the steering angle sensor.

Other than achieving the same results as the results of first embodiment, it is possible for the electric power steering device 1B according to the third embodiment explained above to simplify processing related to angle conversion by replacing steering angle control using the steering angle, with motor angle control using the motor angle variance. In other words, by replacing the control that relied on the steering angle, with angle information within the motor control unit 100B.

Fourth Embodiment

Figure 14:
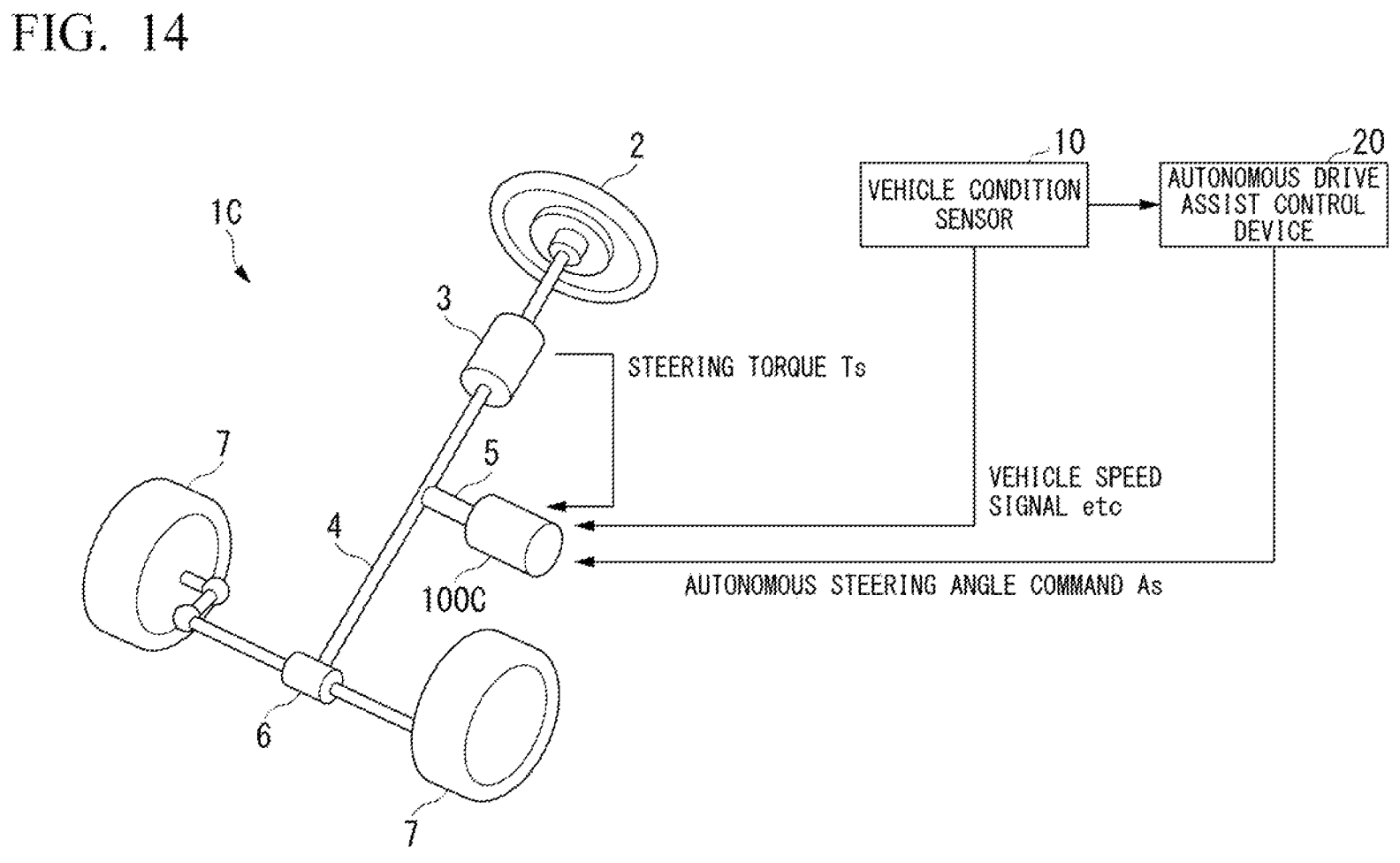

An electric power steering device 1C according to a fourth embodiment is explained. FIG. 14 is a diagram of a vehicle steering system equipped with the electric power steering device 1C according to the fourth embodiment. Parts having similar functions as parts explained in the first embodiment, the second embodiment, or the third embodiment have the same names and reference symbols affixed thereto, with detailed explanations being omitted in the explanations below.

The electric power steering device 1C includes the torque sensor 3, the steering shaft 4, the reducer 5, the rack and pinion gear 6, the vehicle condition sensor 10, the autonomous drive assist control device 20, and a motor control unit 100C. Similar to the first embodiment, the electric power steering device 1C has an autonomous drive assist control so as to continue autonomous drive assist even when an abnormality occurs.

Figure 15:
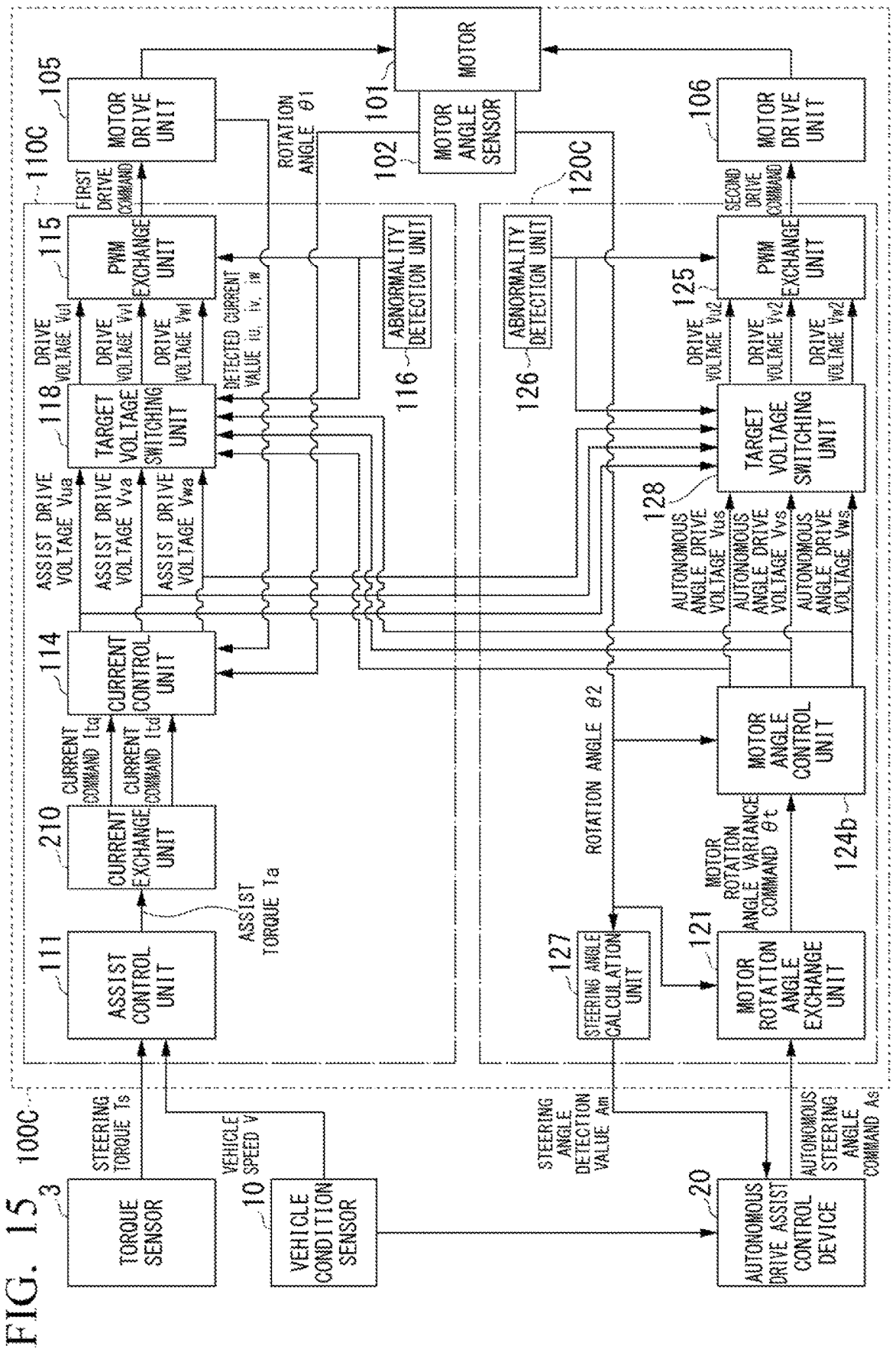
FIG. 15 A block diagram of the motor control according to the fourth embodiment.

FIG. 15 is a block diagram of the motor control unit 100C according to the fourth embodiment. As shown in FIG. 15, the motor control unit 100C includes the motor 101, the motor angle sensor 102, the motor drive unit 105, 106, a first CPU 110C (a first motor controller), and a second CPU 120C (a second motor controller).

The first CPU 110C includes the assist control unit 111, a current exchange unit 210, the current control unit 114, the target voltage switching unit 118, the PWM exchange unit 115, and the abnormality detection unit 116. The second CPU 120C includes the motor angle exchange unit 121, the motor angle control unit 124b, a target voltage switching unit 128, the PWM exchange unit 125, the abnormality detection unit 126, and the steering angle calculation unit 127.

The current exchange unit 210 obtains the assist torque Ta from the assist control unit 111. The current exchange unit 210 calculates each of the current command Itq of the q-axis, and the current command Itd of the d-axis as a current command to suppress an increase of the induced voltage of the motor 101, based on the selected assist torque Ta obtained from the assist control unit 111. The current command Itd of the d-axis may be generated by a well-known control, and for example may be generated based on a maximum torque/current (MTPA) control.

The current control unit 114 obtains the current commands Itd and Itq of the dq axes from the current switching unit 113. The current control unit 114 obtains the detected current values iu, iv, and iw from the current sensor 103. The current control unit 114 converts the detected current values iu, iv, and iw to detected current values Id and Iq of the dq axes. The current control unit 114 calculates the three phase drive voltages Vu1, Vv1 and Vw1 based on the current commands Itd and Itq of the dq axes, and the detected current values Id and Iq of the dq axes.

The drive voltages Vu1, Vv1 and Vw1 calculated by the current control unit 114 are referred to as assist drive voltages Vua, Vva and Vwa. The coordinate converter 136 outputs the assist drive voltages Vua, Vva and Vwa to the target voltage switching unit 118 and the target voltage switching unit 128. The assist drive voltages Vua, Vva and Vwa are voltage target values (first target voltages) to drive the motor 101, and are an example of the first command.

The target voltage switching unit 118 obtains the assist drive voltages Vua, Vva and Vwa calculated by a current feedback of the current control unit 114, from the current control unit 114. The target voltage switching unit 118 obtains autonomous angle drive voltages Vus, Vvs and Vws calculated by an angle feedback of the motor angle control unit 124*b*, from the motor angle control unit 124*b*. The target voltage switching unit 118 selects either one of the assist drive voltages Vua, Vva and Vwa or the autonomous angle drive voltages Vus, Vvs and Vws as the drive voltages Vu1, Vv1 and Vw1. The autonomous angle drive voltages Vus, Vvs and Vws are voltage target values to drive the motor 101, and correspond to the drive voltages Vu, Vv and Vw generated by the motor angle control unit 124*b*. The autonomous angle drive voltages Vus, Vvs and Vws are examples of a second target voltage, and are an example of the second command.

When conducting steering assist control, the target voltage switching unit 118 selects the assist drive voltages Vua, Vva and Vwa as the drive voltages Vu1, Vv1 and Vw1. On the other hand, when conducting autonomous drive assist control, the target voltage switching unit 118 selects the autonomous angle drive voltages Vus, Vvs and Vws as the drive voltages Vu1, Vv1 and Vw1. The target voltage switching unit 118 outputs the drive voltages Vu1, Vv1 and Vw1 to the PWM exchange unit 115.

The target voltage switching unit 128 obtains the assist drive voltages Vua, Vva and Vwa calculated by the current feedback of the current control unit 114, from the current control unit 114. The target voltage switching unit 128 obtains the autonomous angle drive voltages Vus, Vvs and Vws by the angle feedback of the motor angle control unit 124*b*, from the motor angle control unit 124*b*. The target voltage switching unit 128 selects either one of the assist drive voltages Vua, Vva and Vwa or the autonomous angle drive voltages Vus, Vvs and Vws as the drive voltages Vu2, Vv2 and Vw2.

When conducting steering assist control, the target voltage switching unit 128 selects the assist drive voltages Vua, Vva and Vwa as the drive voltages Vu2, Vv2 and Vw2. On the other hand, when conducting autonomous drive assist control, the target voltage switching unit 128 selects the autonomous angle drive voltages Vus, Vvs and Vws as the drive voltages Vu2, Vv2 and Vw2. The target voltage switching unit 128 outputs the drive voltages Vu2, Vv2 and Vw2 to the PWM exchange unit 125.

There is a need to combine an output method of the motor drive unit 105 and an output method of the motor drive unit 106 in the fourth embodiment. As such, it is preferable that the motor 101 has similar winding specifications. However, the motor 101 may also be configured on differing stators, as in the case of tandem motors.

Although a configuration of the motor control unit 100C shown in FIG. 15 is based off of the configuration of the motor control unit 100B shown in FIG. 12, the configuration of the motor control unit 100C is not limited thereto. The motor control unit 100C may include the steering angle switching unit 123 and the motor angle control unit 124 instead of the motor angle exchange unit 121 and the motor angle control unit 124. In such case, the autonomous steering angle command As and the steering angle detection value Am may be input into the motor angle control unit 124 instead of the motor angle variance command θt (motor angle variance), and the autonomous angle drive voltages Vus, Vvs and Vws may be generated.

As such, in the fourth embodiment, the first CPU 110C switches between either of the assist drive voltage generated from the assist torque Ta by the current control unit 114, or the autonomous angle drive voltage generated from the motor angle variance command θt by the motor angle control unit 124*b* as the drive voltage, which is a command when steering is conducted by the vehicle operator. The second CPU 120C switches between either of the assist drive voltage generated from the assist torque Ta by the current control unit 114, or the autonomous angle drive voltage generated from the motor angle variance command θt by the motor angle control unit 124*b* as the drive voltage, which is a command when steering is conducted by the vehicle operator.

Other than achieving the same results as the results of first embodiment, it is possible for the electric power steering device 1C according to the fourth embodiment explained above to simplify calculation by outputting either of the assist drive voltage generated from the assist torque Ta, or the autonomous angle drive voltage generated from the motor angle variance command θt to the PWM exchange unit, rendering processing of the steering angle command unit 122 unnecessary. As a result, it is possible to lessen processing load of the CPU.

Fifth Embodiment

Figure 16:
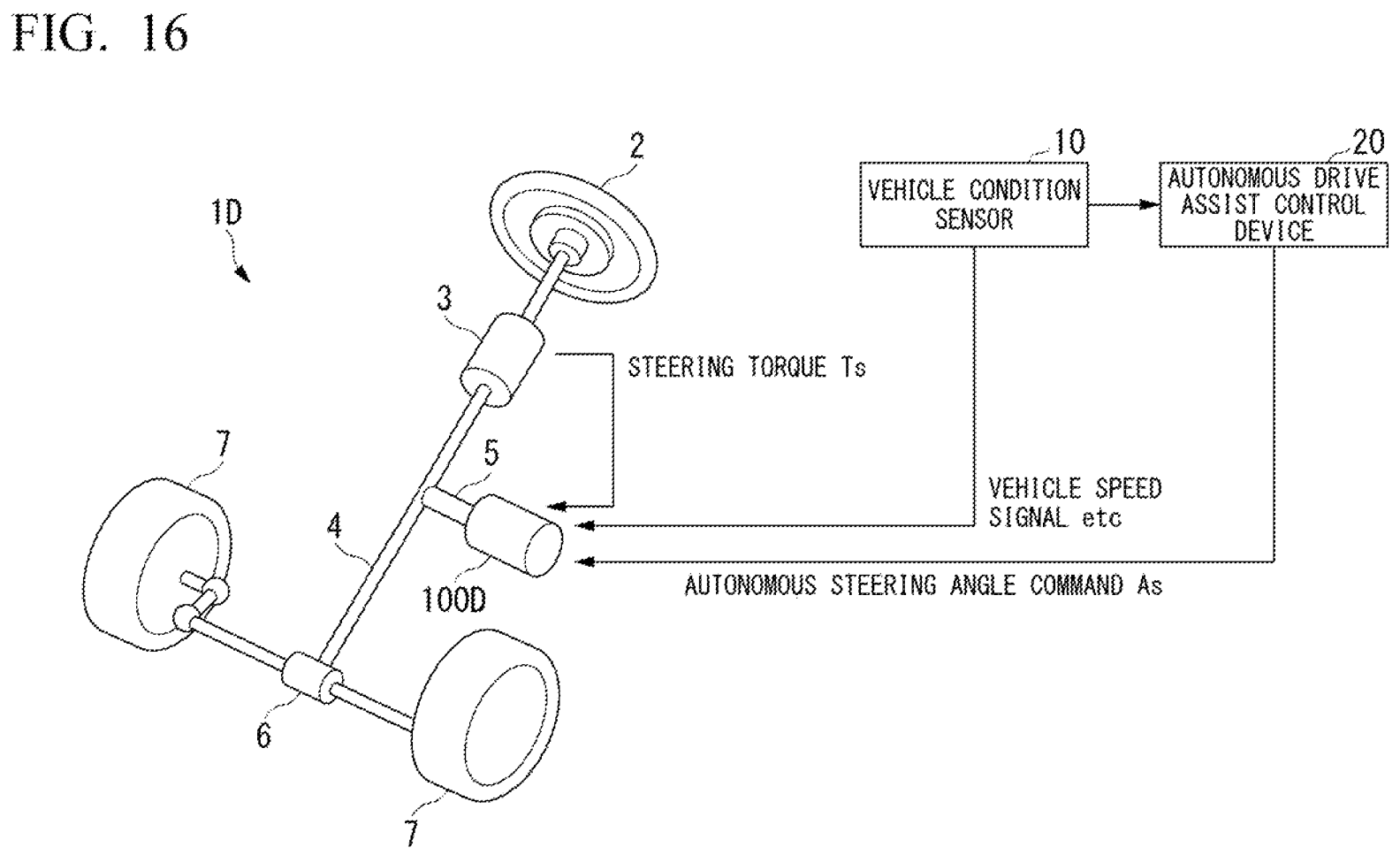

An electric power steering device 1D according to a fifth embodiment is explained. FIG. 16 is a diagram of a vehicle steering system equipped with the electric power steering device 1D according to a fifth embodiment. Parts having similar functions as parts explained in the first embodiment to the fourth embodiment have the same names and reference symbols affixed thereto, with detailed explanations being omitted in the explanations below.

The electric power steering device 1D includes the torque sensor 3, the steering shaft 4, the reducer 5, the rack and pinion gear 6, the vehicle condition sensor 10, the autonomous drive assist control device 20, and a motor control unit 100D. Similar to the first embodiment, the electric power steering device 1D has an autonomous drive assist control so as to continue autonomous drive assist even when an abnormality occurs.

Figure 17:
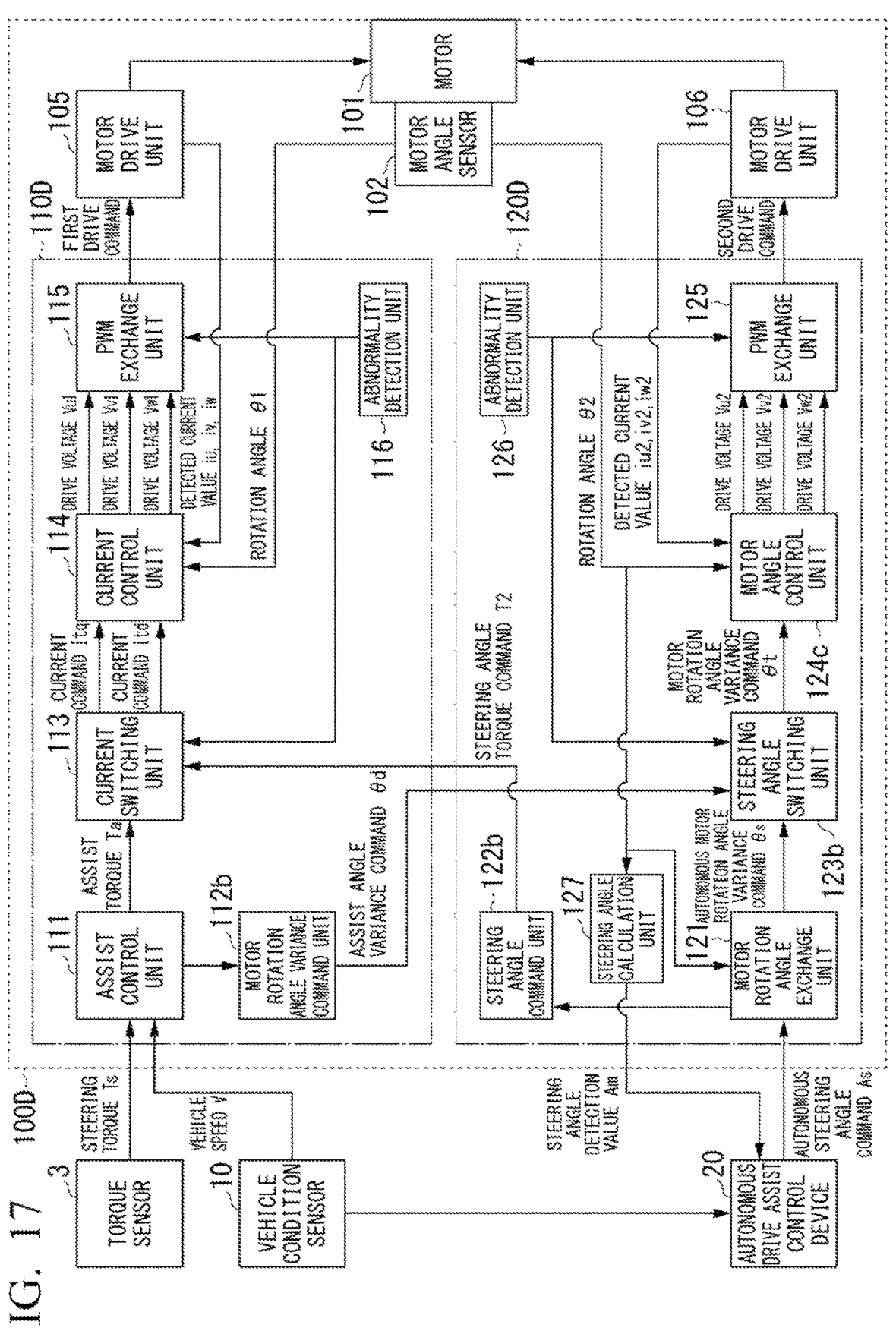
FIG. 17 A block diagram of the motor control according to the fifth embodiment.

FIG. 17 is a block diagram of the motor control unit 100D according to the fifth embodiment. As shown in FIG. 17, the motor control unit 100D includes the motor 101, the motor angle sensor 102, the motor drive unit 105, 106, a first CPU 110D (a first motor controller), and a second CPU 120D (a second motor controller). The motor drive unit 106 according to the fifth embodiment includes the inverter circuit 140 and the current sensor 103. Similar to the motor drive unit 105, the motor drive unit 106 according to the fifth embodiment has the current sensor 103, and outputs three phase detected current values Iu2, Iv2 and Iw2 to a motor angle control unit 124*c*.

The first CPU 110D includes the assist control unit 111, the motor angle variance command unit 112*b*, the current switching unit 113, the current control unit 114, the PWM exchange unit 115, and the abnormality detection unit 116. The second CPU 120D includes the motor angle exchange unit 121, the steering angle command unit 122*b*, the motor angle variance switching unit 123*b*, the motor angle control unit 124*c*, the PWM exchange unit 125, the abnormality detection unit 126, and the steering angle calculation unit 127.

Figure 18:
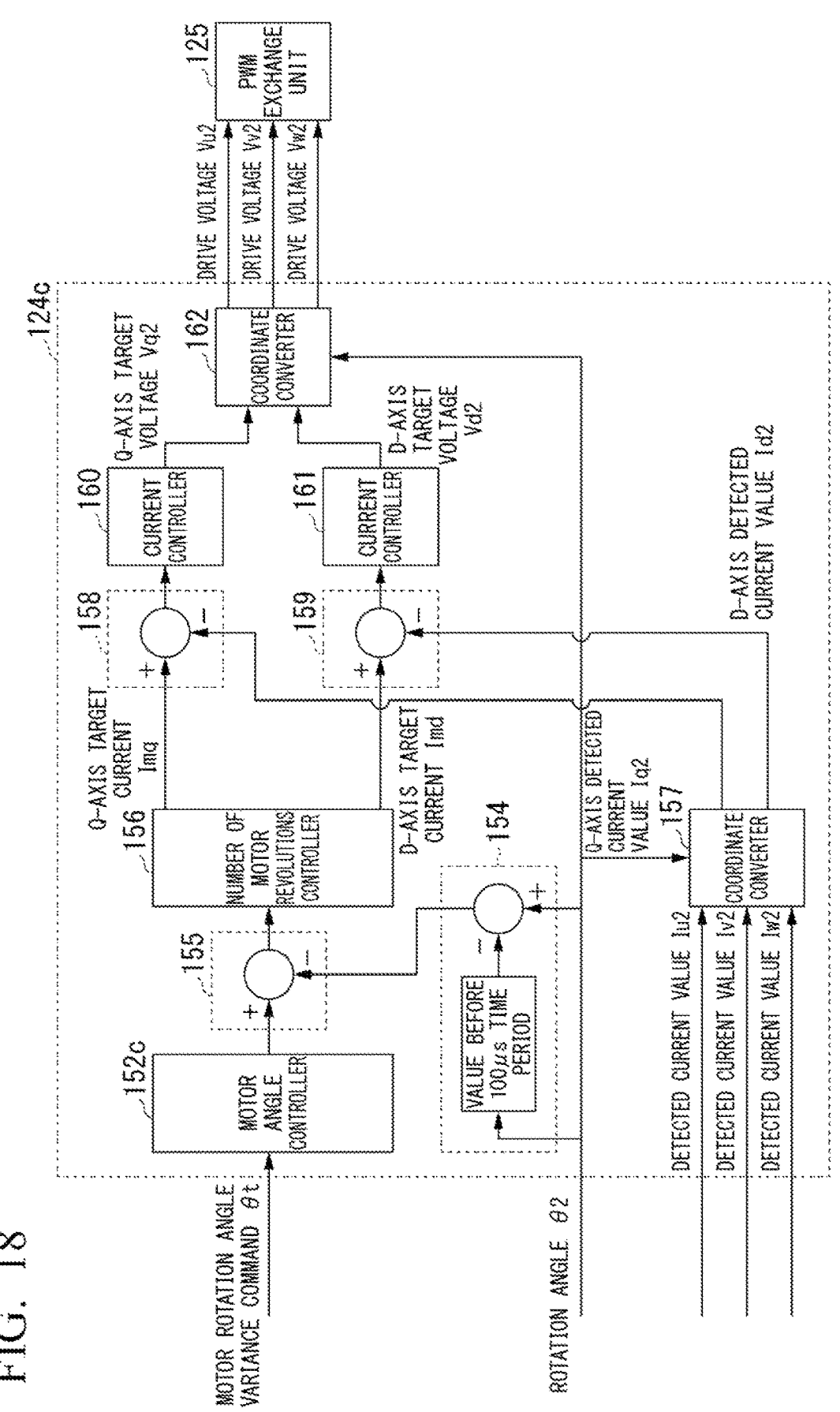
FIG. 18 A block view of a motor angle control unit according to the fifth embodiment.

FIG. 18 is a block view of the motor angle control unit 124*c* according to the fifth embodiment. As shown in FIG. 18, the motor angle control unit 124*c* includes a motor angle controller 152*c*, a motor rotation speed calculation unit 154, a motor speed variance calculator 155, a number of motor revolutions controller 156, a coordinate converter 157, a variance calculator 158, 159, a current controller 160, 161, and a coordinate converter 162.

The motor angle controller 152*c* obtains the motor angle variance command θt from the motor angle variance switching unit 123*b*. The motor angle controller 152*c* generates a target motor rotation speed ωt based on the obtained motor angle variance command θt. For example, the motor angle controller 152*c* conducts feedback control so as to generate the target motor rotation speed ωt so that the motor angle variance command θt is 0. The aforementioned feedback control conducted may be a well-known proportional control, an integral control, a differential control or any combination thereof. Other well-known controls may be used, and/or a plurality of well-known controls may be combined.

The motor rotation speed calculation unit 154 calculates a motor rotation speed om from a difference between a currently detected rotation angle θ2 which the motor angle sensor 102 detects, and a rotation angle θ2*z* which the motor angle sensor 102 detects after a predetermined time period, for example 100s. The motor rotation speed calculation unit 154 outputs the calculated motor rotation speed om to the motor speed variance calculator 155.

The motor speed variance calculator 155 obtains the target motor rotation speed ωt from the motor angle controller 152*c*. The motor speed variance calculator 155 obtains the motor rotation speed ωm from the motor rotation speed calculation unit 154. The motor speed variance calculator 155 calculates a difference between the target motor rotation speed ωt and the motor rotation speed nom, and outputs the calculated difference to the number of motor revolutions controller 156.

The number of motor revolutions controller 156 conducts feedback control so as to generate a target motor rotation torque so that the difference between the target motor rotation speed ωt and the motor rotation speed ωm is 0. Such feedback control conducted may be a well-known proportional control, an integral control, a differential control or any combination thereof. Other well-known controls may be used, and/or a plurality of well-known controls may be combined.

The 156 obtains the target current Imq which is a motor rotation current of the q-axis, and the target current Imd which is a motor a motor rotation current of the d-axis as current commands to suppress an increase of the induced voltage of the 101, based on the generated target motor rotation torque. The target current Imd of the d-axis may be generated by a well-known control, and for example may be generated based on a maximum torque/current (MTPA) control. The number of motor revolutions controller 156 outputs the target current Imq to the variance calculator 158, and the target current Imd to the variance calculator 159.

By conducting coordinate conversion of the three phase detected current values Iu2, Iv2 and Iw2 detected from the current sensor of the motor drive unit 106 to two phase in the coordinate converter 157, the coordinate converter 157 obtains the two phase detected current values Iq2, Id2 of the dq axes, based on the rotation angle θ2 detected at the motor angle sensor 102. The coordinate converter 157 inputs the detected current value Iq2 to the variance calculator 158, and inputs the detected current value Id2 to the variance calculator 159.

The variance calculator 158 calculates a variance between the target current Imq and the detected current value Iq2, and outputs the calculated variance to the current controller 160. The variance calculator 159 calculates a variance between the target current Imd and the detected current value Id2, and outputs the calculated variance to the current controller 161.

The current controller 160 generates the target voltage Vq2 of the q-axis by conducting feedback control so that variance between the target current Imq and the detected current value Iq2 is 0. The current controller 160 outputs the target voltage Vq2 to the coordinate converter 162. The current controller current controller 161 generates the target voltage Vd2 of the d-axis by conducting feedback control so that the variance of the target current Imd and the detected current value Id2 is 0. The current controller 161 outputs the target voltage Vd2 to the coordinate converter 162.

Feedback control of each of the current controller 160 and the current controller 161 may be a well-known proportional control, an integral control, a differential control or any combination thereof. Other well-known controls may be used, and/or a plurality of well-known controls may be combined.

The coordinate converter 162 is connected to the motor angle sensor 102, and obtains the rotation angle θ2 from the motor angle sensor 102. The coordinate converter 162 conducts coordinate conversion of the target voltage Vq2 of the q-axis and the target voltage Vd2 of the d-axis to the three phase drive voltages Vu2, Vv2 and Vw2, based on the rotation angle θ2.

Autonomous drive assist control assists a vehicle operator or controls steering angle instead of the vehicle operator, and is made to steer the steering wheel 2 by a certain amount at the speed which the vehicle operator conducts steering. For example, the steering angle suddenly changes when the autonomous drive assist control device 20 conducts emergency evasion steering of an obstacle present in front of the vehicle. When controlling the steering angle using feedback control by the motor angle, followability is low, and insuring followability in a case where the steering is suddenly changed is thought to be difficult. In such a case, since the electric power steering device 1D according to the fifth embodiment not only conducts feedback control using the motor angle, but controls the steering angle by conducting feedback control using the number of motor revolutions, and feedback control using the motor torque converted to a current transmitted to the motor, it is possible to increase a responsiveness more than when feedback is conducted only using the motor angle.

Other than achieving the same results as the results of first embodiment, since the electric power steering device 1D according to the fifth embodiment conducts feedback control using the number of motor revolutions, and feedback control using the motor torque converted to a current transmitted to the motor, it is possible to increase the responsiveness more than when feedback is conducted only using the motor angle.

Although configurations of the present disclosure have been explained with reference to the drawings, actual configurations are not limited to the aforementioned embodiments, and designs that do not depart from the gist of the present disclosure are included.

REFERENCE SIGN LIST 1, 1A, 1B, 1C, 1D . . . Electric Power Steering Device, 3 . . . Torque Sensor, 10 . . . Vehicle Condition Sensor, 100, 100A, 100B, 100C, 100D . . . Motor Control Unit, 110,
110A, 110B, 110C, 110D . . . First CPU, 120, 120A, 120B,
120C, 120D . . . Second CPU, 101 . . . Motor

The invention claimed is:

1. An electric power steering device comprising:
a vehicle condition sensor that detects vehicle condition
of a vehicle, and detects information from outside the
vehicle;
an autonomous drive assist controller that generates a
steering angle command of a steering of the vehicle
based on a detection result of the vehicle condition
sensor;
a torque sensor that detects a steering torque of the
steering;
a motor that is rotated to obtain the steering angle of the
steering;
a first motor controller that conducts steering assist con-
trol to assist steering of the motor based on detection
results of the torque sensor, and
a second motor controller that conducts autonomous drive
assist control that conducts autonomous steering of the
steering by drive control of the motor, according to the
steering angle command, wherein:
the first motor controller
sends a first command to the second motor controller in
order to conduct drive control of the motor when
conducting the steering assist control, and
assists drive of the motor by drive control of the motor
based on a second command sent from the second
motor controller to conduct drive control of the
motor when conducting the steering assist control,
and
the second motor controller
sends the second command to the first motor controller
when conducting the autonomous drive assist con-
trol, and
assists drive of the motor by drive control of the motor
based on the first command to conduct the steering
assist control.

2. The electric power steering device according to claim
1, wherein:
the first motor controller calculates a target steering angle
which is a target value of a steering angle, and sends the
calculated target steering angle as the first command to
the second motor controller, when conducting the steer-
ing assist control, and
the second motor controller calculates a steering angle
torque command based on a variance between the
steering angle command and a detected steering angle
value, as a target value of a motor torque, and sends the
calculated steering angle torque command as the sec-
ond command to the first motor controller when con-
ducting the autonomous drive assist control.

3. The electric power steering device according to claim
2, wherein:
drive control of the motor is continued only by the second
motor controller in a case where the first motor con-
troller is not able to conduct drive control of the motor
due to an abnormality when conducting the steering
assist control, and
drive control of the motor is continued only by the first
motor controller when the second motor controller is
not able to conduct drive of the motor due to an
abnormality when conducting the autonomous drive
assist control.

4. The electric power steering device according to claim
2, wherein:

the second motor controller stops drive control of the
motor in a case where it is not possible to receive the
first command from the first motor controller when
conducting the steering assist control, and
the first motor controller calculates a torque target value
to obtain the steering angle based on a variance
between the steering angle command output from the
autonomous drive assist controller and a detected rota-
tion angle of the motor, and conducts drive control of
the motor based on the calculated torque target value,
in a case where it is not possible to receive the second
command from the second motor controller when con-
ducting the autonomous drive assist control.

5. The electric power steering device according to claim
1, wherein:
the first motor controller sends a first variance which is a
variance between a rotation angle of the motor made to
be a target and a detected rotation angle of the motor,
as the first command to the second motor controller
when conducting the steering assist control, and
the second motor controller
converts the steering angle command to a rotation angle
of the motor,
drives the motor based on a second variance which is
a variance between the converted rotation angle of
the motor and a detected rotation angle of the motor,
while calculating a steering angle torque command
which is a target value of a torque to obtain the
steering angle based on the second variance, and
sends the steering angle torque command to the first
motor controller as the second command when con-
ducting the autonomous drive assist control.

6. The electric power steering device according to claim
5, wherein:
drive control of the motor is continued only by the second
motor controller in a case where the first motor con-
troller is not able to conduct drive control of the motor
due to an abnormality when conducting the steering
assist control, and
drive control of the motor is continued only by the first
motor controller when the second motor controller is
not able to conduct drive of the motor due to an
abnormality when conducting the autonomous drive
assist control.

7. The electric power steering device according to claim
5, wherein:
the second motor controller stops drive control of the
motor in a case where it is not possible to receive the
first command from the first motor controller when
conducting the steering assist control, and
the first motor controller calculates a torque target value
to obtain the steering angle based on a variance
between the steering angle command output from the
autonomous drive assist controller and a detected rota-
tion angle of the motor, and conducts drive control of
the motor based on the calculated torque target value,
in a case where it is not possible to receive the second
command from the second motor controller when con-
ducting the autonomous drive assist control.

8. The electric power steering device according to claim
1, wherein:
the first motor controller calculates a first target voltage
which is a voltage target value to drive the motor, and
sends the calculated first target voltage as the first
command to the second motor controller when con-
ducting the steering assist control, and the second motor controller calculates a second voltage target value which is a target voltage to drive the motor, and sends the calculated second target voltage as the second command to the first motor controller when conducting the autonomous drive assist control.

9. The electric power steering device according to claim 8, wherein:

drive control of the motor is continued only by the second motor controller in a case where the first motor controller is not able to conduct drive control of the motor due to an abnormality when conducting the steering assist control, and drive control of the motor is continued only by the first motor controller when the second motor controller is not able to conduct drive of the motor due to an abnormality when conducting the autonomous drive assist control.

10. The electric power steering device according to claim 8, wherein:

the second motor controller stops drive control of the motor in a case where it is not possible to receive the first command from the first motor controller when conducting the steering assist control, and the first motor controller calculates a torque target value to obtain the steering angle based on a variance between the steering angle command output from the autonomous drive assist controller and a detected rotation angle of the motor, and conducts drive control of the motor based on the calculated torque target value, in a case where it is not possible to receive the second command from the second motor controller when conducting the autonomous drive assist control.

11. The electric power steering device according to claim 1, wherein:

drive control of the motor is continued only by the second motor controller in a case where the first motor controller is not able to conduct drive control of the motor due to an abnormality when conducting the steering assist control, and drive control of the motor is continued only by the first motor controller when the second motor controller is not able to conduct drive of the motor due to an abnormality when conducting the autonomous drive assist control.

12. The electric power steering device according to claim 1, wherein:

the second motor controller stops drive control of the motor in a case where it is not possible to receive the first command from the first motor controller when conducting the steering assist control, and the first motor controller calculates a torque target value to obtain the steering angle based on a variance between the steering angle command output from the autonomous drive assist controller and a detected rotation angle of the motor, and conducts drive control of the motor based on the calculated torque target value, in a case where it is not possible to receive the second command from the second motor controller when conducting the autonomous drive assist control.

* * * * *